US012739317B2

(12) United States Patent
Fu et al.

(10) Patent No.: US 12,739,317 B2
(45) Date of Patent: Sep. 15, 2026

(54) ADU ASSOCIATION METHOD AND COMPUTER DEVICE

(71) Applicant: GUANGDONG OPPO MOBILE TELECOMMUNICATIONS CORP., LTD., Dongguan (CN)

(72) Inventors: Zhe Fu, Dongguan (CN); Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 151 days.

(21) Appl. No.: 18/615,682

(22) Filed: Mar. 25, 2024

(65) Prior Publication Data

US 2024/0236215 A1 Jul. 11, 2024

Related U.S. Application Data

(63) Continuation of application No. PCT/CN2021/121712, filed on Sep. 29, 2021.

(51) Int. Cl.
*H04L 69/22* (2022.01)

(52) U.S. Cl.
CPC .................................... *H04L 69/22* (2013.01)

(58) Field of Classification Search
CPC ....................................................... H04L 69/22
See application file for complete search history.

(56) References Cited

U.S. PATENT DOCUMENTS 5,139,709 A 8/1992 Huang et al.
7,828,290 B2 11/2010 Muratani
10,320,705 B1 * 6/2019 Li ........................ H04L 47/2441
2008/0109865 A1 * 5/2008 Su ...................... H04N 21/2401 725/116
2014/0189760 A1 * 7/2014 Payette ............ H04N 21/64738 725/86
2021/0029590 A1 * 1/2021 Ying ....................... H04W 8/08
2021/0136589 A1 * 5/2021 Kawasaki ............. H04W 12/08
2021/0320862 A1 * 10/2021 Hao .................... H04L 67/2871

FOREIGN PATENT DOCUMENTS

CN 1470980 A 1/2004
CN 1602614 A 3/2005
CN 101809967 A 8/2010
CN 110073301 A 7/2019
CN 109311269 B 5/2020
CN 112311947 A 2/2021
CN 112703457 A 4/2021
TW 202016129 A 5/2020
WO 2009086771 A1 7/2009

OTHER PUBLICATIONS

3GPP TS 23.501 V16.7.0 (Dec. 2020) ; 3rd Generation Partnership Project; Technical Specification Group Services and System Aspects; System architecture for the 5G System (5GS); Stage 2(Release 16)(442 pages).

International Search Report and Written Oppinion, International Patent Application No. PCT/CN2021/121712, mailed Apr. 26, 2022 (13 pages).

* cited by examiner

*Primary Examiner* — Dave Czekaj
(74) *Attorney, Agent, or Firm* — Ladas & Parry LLP

(57) ABSTRACT

An ADU association method and a computer device are provided. The method includes acquiring first information, wherein the first information comprises ADU association information.

19 Claims, 5 Drawing Sheets

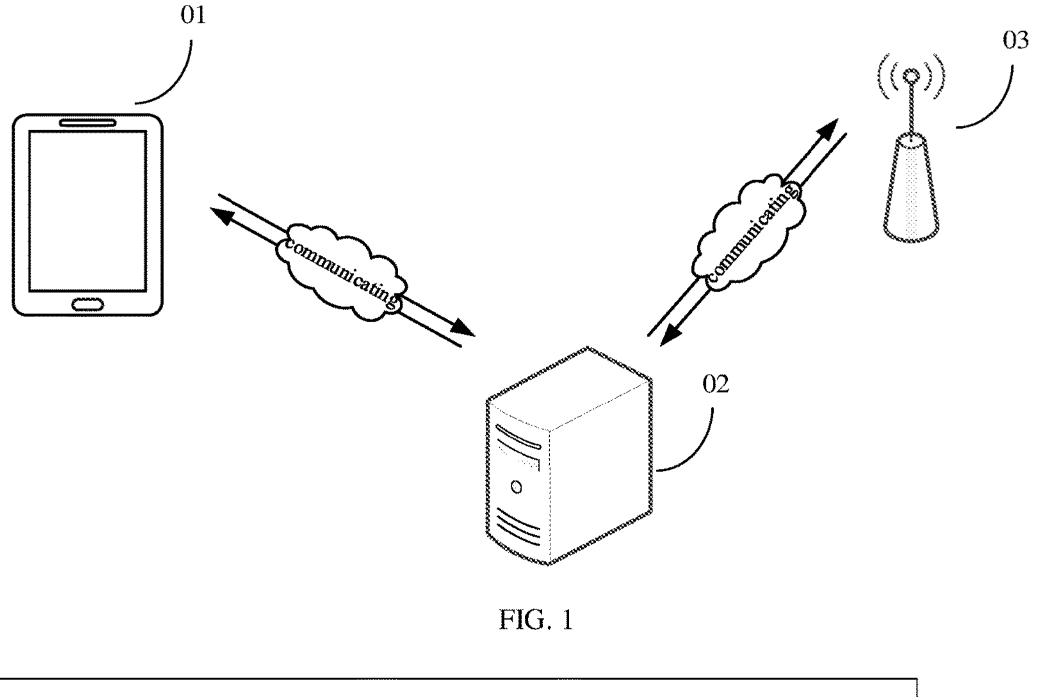
FIG. 1
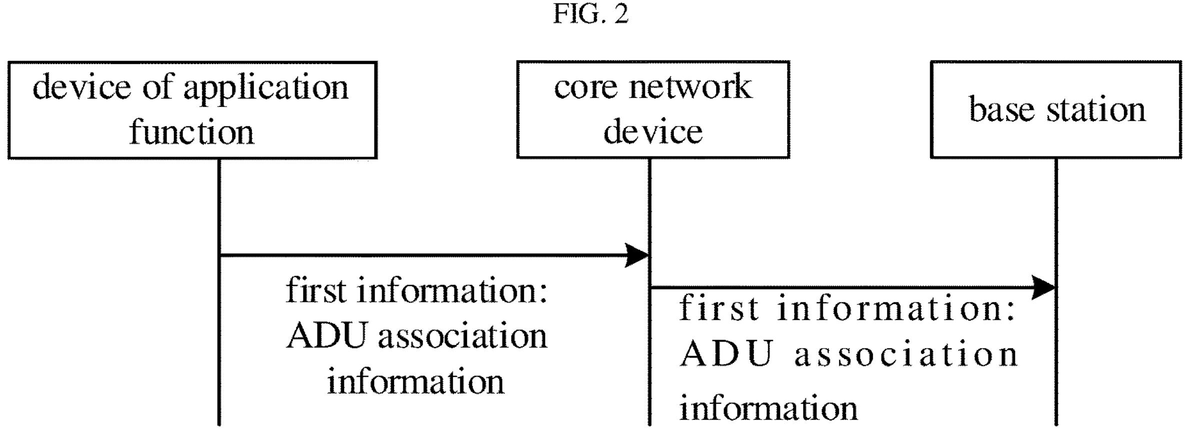
FIG. 2
device of application function
core network device
base station
first information: ADU association information
first information: ADU association information
FIG. 3

ADU ASSOCIATION METHOD AND COMPUTER DEVICE

CROSS REFERENCE TO RELATED APPLICATIONS

The present disclosure is a continuation of International Application No. PCT/CN2021/121712 filed Sep. 29, 2021, which is herein incorporated by reference in its entirety.

TECHNICAL FIELD

The present disclosure relates to a technical field of data transmission, and in particular to an application data unit (ADU) association method and a computer device.

BACKGROUND

In a process of data transmission, application layer data exchanged between a User Equipment (UE) and an application server or a UE of an opposite end generally is application layer data after particular encoding and compression, i.e., an Application Data Unit (ADU). The ADU may be a frame or an encoded chip.

Two ADUs in an application layer may have a correlation relationship. For example, an ADU of audio data ADU and an ADU of another video or image data are required to be played at the same time, or an ADU of a video frame and a subtitle corresponding thereto are required to played at the same time in order to meet viewing requirements of a user side. For another example, some ADUs are configured to be correctly decoded when both before and after ADUs thereof associated with them arrive.

SUMMARY OF THE DISCLOSURE

On such basis, it is necessary to provide an ADU association method, an ADU association apparatus, a computer device, and a storage medium.

In a first aspect, the embodiments of the present disclosure provide an ADU association method. The method includes acquiring first information, wherein the first information includes ADU association information.

In a second aspect, the embodiments of the present disclosure provide an ADU association method. The method includes sending first information, wherein the first information includes ADU association information.

In a third aspect, a computer device is provided and includes a memory and a processor. The memory stores a computer program. When the processor executes the computer program, one or more operation of a method according to the method in the second aspect is implemented.

BRIEF DESCRIPTION OF THE DRAWINGS

FIG. 1 is a diagram of an application environment of an ADU association method according to an embodiment.

FIG. 2 is a schematic flowchart of the ADU association method according to an embodiment.

FIG. 3 is schematic view of flow exchanging of the ADU association method according to an embodiment.

DETAILED DESCRIPTION

Figure 4:
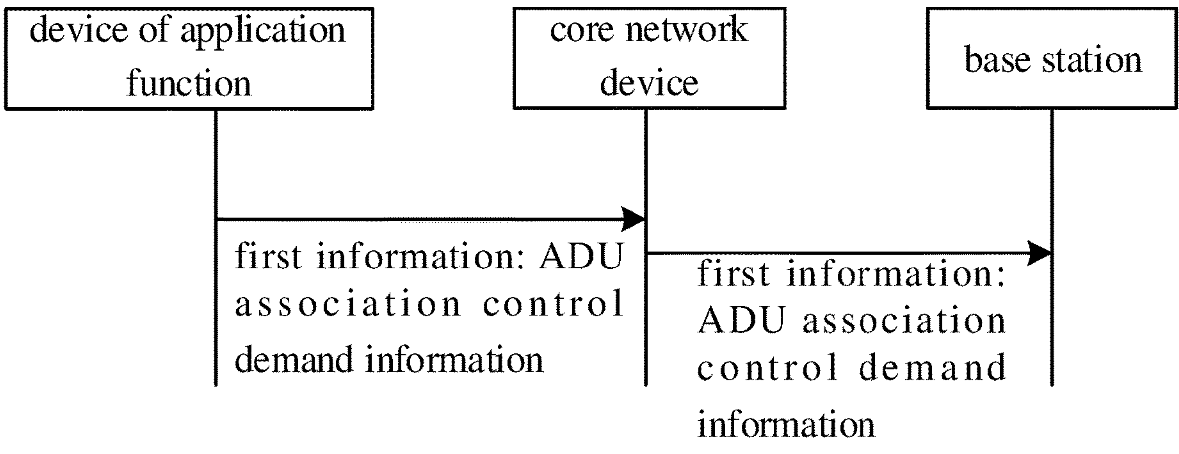
FIG. 4 is a schematic view of flow exchanging of the ADU association method according to another embodiment.

In order to make an object, a technical solution, and advantages of the present disclosure clearer and more straightforward, the present disclosure will be further described in detail below in conjunction with accompanying drawings and embodiments. It should be understood that concrete embodiments described herein are simply used to explain the present disclosure, and are not used to limit the present disclosure.

Before describing an ADU association method provided in the embodiments of the present disclosure, some relevant technologies involved in the present disclosure are introduced firstly.

As communication technologies evolve, support of a 3rd Generation Partnership Project (3GPP) system support for vertical industries will become more and more extensive and in-depth. For example, Ultra Reliable Low Latency Communication (URLLC) is required to support transmission of services such as Factory automation, Transport Industry, and Electrical Power Distribution, etc., in a 5G system. Extended Reality (XR) is required to support the transmission of a service of Augmented Reality (AR)/virtual reality (VR)/Cloud Gaming (CG). These services generally have requirements of reliability and time delay, because when scheduling resources for UEs, they have to meet Quality of Service (QoS) demands for data transmission. In addition, for the UEs, a problem of power assumptions of the UEs should also be considered, and unnecessary power assumptions should be avoided. Meanwhile, a problem of accessing of a large number of UEs supporting these services, a demand of network capacities should also be ensured during resource allocating.

Exemplarily, some scenarios are required to support a service having a demand of a minimum delay of 0.5 ms and a reliability of 99.999%, such as the URLLC and the XR. These services may be pseudo-period. That is, a service arriving time has a jitter, which may be understood to be that the service will not arrive at a definite point, but at any moment within a range. Also, a service period may be a non-integer period, e.g., 16.67 ms. In addition, arriving times of different service flows of the same service may vary significantly (e.g., for the AR, an Up Link (UL) pose period may be 4 ms, while an UL video period may be 16.67 ms).

In the related art, possible service models for an AR/VR/CG service may include the following.

VR: UL pose information+Down Link (DL) video stream;

CG: UL control information (Uplink control information)+DL video stream;

AR: UL (pose information+video stream)+DL video stream.

A period of control information or pose information in the above service models may be 4 ms, and a size demand of a data pocket may be 100 bytes. A period of the video stream may be 16.67 ms, and a size demand of a data packet size may be approximately 0.67 Mbps.

Exemplarily, in some scenarios, each service is a pseudo-period service. That is, the service arrives periodically. Whereas an arriving time point of the service in each period has a jitter, i.e., arriving at within a time range.

In some scenarios, for the AR, the AR has the pose information and video information in one period of the UL. The two information streams have different arriving times and different sizes of the data pockets.

In a data transmission process, application layer data is usually data after particular encoding and compression processes, which is referred to as an ADU. The ADU may be a frame, or an encoded chip. For example, a commonly-used H.264 video codec technology standard is employed for encoding and compression. The H.264 standard formats the data and provides header information of the application layer data through a Network Abstraction Layer. NAL. In an encoding process, a part of a video frame sequence is compressed into an I frame, another part is compressed into a P frame, and a further part is compressed into a B frame. The I frame is a key frame and belongs to an intra-frame compression, and only data of a current frame is required to accomplish decoding. While the P frame and the B frame have no complete picture data, and only have data with differences from pictures of neighbor frames, and the pictures of neighbor frames are required to be added with the differences defined in current frames during decoding to generate final pictures.

In the data transmission process, the application layer data includes multiple ADUs. Two or more ADUs may have a particular association relationship. However, in a case where one data frame is successfully sent to the UE and one or more associated frame thereof fails to arrive at the UE, a problem such as unsynchronized playbacks of the audio and the video, a decoding failure, etc. may be caused, which may result in a relatively large impact on the quality of the data transmission.

On such basis, the embodiments of the present disclosure provide an ADU association method, an ADU association apparatus, a computer device, and a storage medium, which may improve the problem such as the unsynchronized playbacks of the audio and the video, the decoding failure, etc., in the process of the data transmission. It is noted that the ADU association method provided in the embodiments of the present disclosure is not limited to the above technical effect, and may achieve other technical effects. For example, the ADU association method provided in the embodiments of the present disclosure may also avoid unnecessary power assumption of a UE end or a base station end and improve a resource utilization rate, and the present disclosure is not limited thereto.

The ADU association method provided in the embodiments of the present disclosure may be applied to an application scenario as illustrated in FIG. 1. As shown in FIG. 1, the scenario includes a device of application function 01, a core network device 02, and a base station 03. Each two of the device of the application function 01, the core network device 02, and the base station 03 may communicate with each other. The device of the application function 01 may be, but is not limited to, a UE device such as various personal computers, laptops, smartphones, tablets, and portable wearable devices, and may also be other network devices, which is not limited in the embodiments of the present disclosure. The core network device 02 includes, but is not limited to, a policy control function (PCF) module, a session management function (SMF) module, a user plane function (UPF) module, and the like. The base station 03 includes, but is not limited to, a macro base station, a micro base station, an RF pull-out, a repeater, and an indoor distribution system, etc. It should be noted that the present disclosure may also include more devices of the application function 01 and is not limited to the number shown in FIG. 1.

An ADU association method performed by the core network as an executing entity is described first through some embodiments in the following.

FIG. 2 is a flowchart of the ADU association method according to an embodiment. This embodiment involves an implementation manner of acquiring first information including ADU association information, such that the base station may perform resource scheduling, allocating, and data transmission based on the first information. As shown in FIG. 2, the embodiment includes an operation S101.

At block S101, the method includes acquiring the first information. The first information includes the ADU association information.

In this embodiment, the ADU association information refers to information of interinfluence and/or interaction existing between or among two or more ADUs. An association information type is not limited in the embodiments of present disclosure.

In an embodiment, the ADU association information is configured to indicate at least one of association information between different ADUs, identification information of the different ADUs, and identifier information of ADUs.

The association information between different ADUs refers to information that a first ADU has an association with a second ADU. The different ADUs may be different types of ADUs, such as, an I frame and a P frame, an I encoded chip and a P encoded chip, a pose data stream and a video stream, etc. Alternatively, the different ADUs may also be different frames, different encoded chips, different data flows of the same type, which is not limited in the embodiments of the present disclosure.

The identification information of the different ADUs indicates the different ADUs have different identification information, such as first ADU identification information, second ADU identification information, third ADU identification information, etc. The identification information may be information which may distinguish and locate the different ADUs, such as identifiers, codes, IP five-tuples, etc.

In an embodiment, the identification information of an ADU includes at least one of an ADU identifier, an ADU period, a data arriving time of the ADU, a data arriving offset of the ADU, and a pocket size of the ADU, and an IP five-tuple.

The identifier information of the ADUs, for example, a first ADU identifier is the I frame, a second ADU identifier is the P frame. For another example, the first ADU identifier is a high priority, while the second ADU identifier is a low priority. The identifier information of the ADUs may also be different data types of identifiers. For example, the ADUs may be identified as control or data, the IP five-tuples, etc. The identifier information is not limited in the embodiments of the present disclosure.

In an embodiment, the first information is configured to perform at least one of: identifying the ADUs, indicating associated ADUs, indicating ADU-association-controls, and processing the associated ADUs.

Based on acquired first information, regardless of whether the first information including any one of the ADU association information described above, the first information may indicate to perform operations such as identifying, processing, and controlling, etc., for the ADU association information.

The first information may be configured to identify the ADUs. For example, the ADU association information in the first information may include identification information of the first ADU and the identification information of the second ADU, such that the first ADU and the second ADU may be accurately identified based on the first information.

The first information may be configured to indicate the associated ADUs. For example, the ADU association information in the first information includes that the first ADU and the second ADU are required to be sent simultaneously or arrive simultaneously or arrive within a preset duration, such that the first ADU and the second ADU may be determined to belong to the associated ADUs based on the first information. Alternatively, the first information includes an identifier indicating that the first ADU is associated with the second ADU.

The first information may be configured to indicate the ADU-association-controls. For example, the ADU association information in the first information may include a staring time requirement of the associated ADUs, an arriving time requirement of the associated ADUs, a time delay of the associated ADUs, a delay budget of the associated ADUs, a requirement of code error rate, etc.

The first information may also be configured to indicate to process the associated ADUs. For example, the core network device may identify, buffer, and perform data processing for the associated ADUs based on the first information. The core network device may also send the acquired first information to the base station. The first information includes association information of the first ADU and the second ADU. After receiving the first information, the base station is required to perform corresponding processing for the first ADU and the second ADU based on the association information of the first ADU and the second ADU. In an embodiment, the base station performs synchronous processing for the first ADU and the second ADU.

The core network device may perform at least one of identifying the ADUs, determining the associated ADUs, indicating the ADU-association-controls, and processing the associated ADUs based on the first information. Alternatively, after the first information is sent to the base station, the base station performs at least one of identifying the ADUs, determining the associated ADUs, indicating the ADU-association-controls, and processing the associated ADUs. No limitation is made in the embodiments of the present disclosure.

In listed-above identifying the ADUs, indicating the associated ADUs, indicating the ADU-association-controls, and processing the associated ADUs, whether an identifying operation, a processing operation, or a control operation is performed, an ultimate purpose of each of these operations is to facilitate the base station to schedule corresponding ADUs, allocate resources or guarantee a demand of sending the corresponding ADUs as a whole, etc., based on the ADU association information in the first information. Therefore, the ADU association method is provided in the embodiments of the present disclosure. The method includes acquiring the first information through the core network device, and the first information including the ADU association information, which is equivalent to the core network device acquiring the ADU association information. In this way, after the first information is sent to the base station, the base station may schedule a sent data pocket, allocate the resources, or guarantee the demand of sending the associated ADUs as the whole, such that data frames having an association relationship may be processed or processed synchronously. Thereby, the sent data pocket may be ensured to be accurately and completely decoded and the audio and the video may be ensured to be played synchronously, such that the quality of the data transmission may be improved.

In an embodiment, in the above operation S101, the core network device acquiring the first information including the ADU association information may be achieved through receiving the first information sent by the device of the application function.

Taking the device of the application function being an application APP as an example, in actual applications, the APP configures the ADU association information for a data transmission demand, and sends the ADU association information as the first information to the core network device.

In some embodiments, the application function may also come from a UE side. As shown in FIG. 3, in the actual applications, the UE may directly acquire the ADU association information in a current data transmission process based on configured information and sends the ADU association information as the first information to the core network device.

As shown in FIG. 3, after receiving the first information, the core network device may send the first information to the base station, such that the base station may schedule the sent data pocket, allocate the resources, or guarantee the demand of sending the associated ADUs as the whole.

In an embodiment, in accordance with associated objects corresponding to association information, the association information may be distinguished to frames, encoded chips, data flows, QoS flows, etc. The association information between the ADUs may include at least one of association information between the frames, association information between the encoded chips, an association relationship between different data flows, and an association relationship between different QoS flows.

In the embodiments of the present disclosure, the ADU association information may be association information between frames in an audio/video stream, e.g., association information between frame types of the I frame and the P frame, association information between frame identifiers, and association information between frame sets, etc. The ADU association information may also be association information between encoded chips in a frame, e.g., association information between encoded chip types between an I encoded chip and a P encoded chip in the frame, association information between encoded chip identifiers, and association information between the encoded chip sets, etc. Alternatively, the ADU association information may be association information of encoded chips in different frames which have no relationship among frames. For example, a frame 1 and a frame 5 have no relationship. However, in this case, the ADU association information refers to association information between an I encoded chip in the frame 1 and an I encoded chip in the frame 5. Of course, the ADU association information may also be association information between different data flows, e.g., association information between data flow types of a pose data flow and a video data flow, association information between data flow identifiers, and association information between data flow sets, etc. Alternatively, the ADU association information may also be association information between different QoS flows, e.g., association information between QoS flow types of a first QoS flow and a second QoS flow, association information between QoS flow identifiers, and association information between QoS flow sets, etc. Further, the ADU association information may also include association information between Protocol Data Unit (PDU) session types of the ADUs, association information between PDU session identifiers, and association information between data pocket types, etc.

In another embodiment, in accordance with association items corresponding to the association information, the association information may be distinguished to the numbers, times, periods, etc. On such basis, the association information between the ADUs may include at least one of one or more association relationship between the first ADU and at least one second ADU, the number of associations between the first ADU and the at least one second ADU, one or more time point at which the first ADU and the at least one second ADU start to be associated, one or more time at which the first ADU and the at least one second ADU associated with the first ADU arrive, and one or more association period of the first ADU and the at least one second ADU.

The at least one second ADU includes the same ADU, or the at least one second ADU includes different ADUs.

In the embodiments of the present disclosure, the association information of the ADUs may refer to a relationship of an association number, a relationship of association times, and a relationship of an association period.

The first ADU and the at least one second ADU are taken as an example for illustration. The at least one second ADU may be of the same type or the same attribution as the first ADU. For example, the first ADU and the at least one second ADU are ADUs belonging to the same QoS flow, the same stream flow, etc. The at least one second ADU may also be of different types or different attributions as the first ADU. For example, the first ADU and the at least one second ADU are ADUs belonging to different QoS flows, different stream flows, etc.

The first ADU and the at least one second ADU are taken as an example for illustration. The first ADU refers to any ADU, and the at least one second ADU refers to any one or more ADU different from the first ADU. That is, the at least one second ADU may be a single ADU or may include a plurality of ADUs. If the at least one second ADU includes the plurality of ADUs, and the plurality of ADUs may have the same type or may also have different types. Further, the at least one second ADU may also include the same ADUs or include different ADUs. The content of the same or different ADUs in the embodiments of the present disclosure includes, but is not limited to, the same or different priorities, the same or different identifiers, the same or different categories or types. For example, the first ADU and the second ADU are the same type of ADUs or different types of ADUs, the first ADU and the second ADU are the same category of ADUs or different categories of ADUs, or, the first ADU and the second ADU are ADUs having the same identifiers or ADUs having different identifiers, the first ADU and the second ADU are ADUs having the same attributions or ADUs having different attributions, or, the first ADU and the second ADU are ADUs having the same priorities or ADUs having different priorities, etc. The content of the ADUs being the same or different is not limited in the embodiments of the present disclosure.

The one or more association relationship between the first ADU and the at least one second ADU refers to an indication of the one or more association existing between the first ADU and the at least one ADU. The number of associations between the first ADU and the at least one second ADU refers to including the number of the at least one second ADUs associated with the first ADU, or the number of times of the first ADU being required to be associated with the at least one second ADU, etc.

The one or more time point at which the first ADU and the at least one second ADU start to be associated refers to one or more moment point of starting to be associated. The first ADU and the second ADU may be associated to each other at the same moment point. For example, the first ADU and the second ADU are associated with each other at the same moment point S1. The first ADU and the second ADU may also be associated to each other at different moment points. For example, the first ADU is associated with the second ADU at the moment point S1, while the second ADU is associated with the first ADU at a moment point S2.

The one or more time at which the first ADU and the at least one second ADU associated with the first ADU arrive may indicate that an arriving time of the first ADU and an arriving time of the second ADU are the same or satisfy a preset time interval and the like. For example, the arriving time of the first ADU is X, the arriving time of the second ADU is Y, and X is the same as Y, or an interval between X and Y is less than a preset threshold and the like.

The one or more association period of the first ADU and the at least one second ADU includes, but is not limited to, the first ADU and the second ADU being in the same period, or being in different periods. Alternatively, a period in which the first ADU is and a period in which the second ADU is satisfy a preset condition. For example, the preset condition is that one period is spaced between the period in which the first ADU is and the period in which the second ADU is, etc.

The association information between the ADUs is illustrated in the above embodiment. In another embodiment, the ADU association information may also be configured to indicate at least one of the one or more association relationship between the first ADU and at least one second ADU, the number of the associations between the first ADU and the at least one second ADU, the one or more time point at which the first ADU and the at least one second ADU start to be associated, the one or more time at which the first ADU and the at least one second ADU associated with the first ADU arrive, the one or more association period between the first ADU and the at least one second ADU, and a arriving sequence of the first ADU and at least one second ADU.

The at least one second ADU includes the same ADU, or the at least one second ADU includes the different ADUs.

The first ADU and the at least one second ADU are taken as an example for illustration. The at least one second ADU may be of the same type or the same attribution as the first ADU. For example, the first ADU and the at least one second ADU are the ADUs belonging to the same QoS flow, the same stream flow, etc. The at least one second ADU may also be of different types or different attributions as the first ADU. For example, the first ADU and the at least one second ADU are the ADUs belonging to the different QoS flows, the different stream flows, etc.

The first ADU refers to any ADU, and the at least one second ADU refers to any one or more ADU different from the first ADU. That is, the at least one second ADU may be the single ADU or may include the plurality of ADUs. The plurality of ADUs may have the same type or may also have different types. Further, the at least one second ADU may also include the same ADUs or include the different ADUs. The content of the same or different ADUs in this embodiment includes, but is not limited to, the same or different priorities, the same or different identifiers, the same or different categories or types. For example, the first ADU and the second ADU are the same type of ADUs or the different types of ADUs, the first ADU and the second ADU are the same category of the ADUs or the different categories of ADUs, or, the first ADU and the second ADU are the ADUs having the same identifiers or the ADUs having different identifiers, the first ADU and the second ADU are the ADUs having the same attributions or the ADUs having the different attributions, or, the first ADU and the second ADU are the ADUs having the same priorities or the ADUs having the different priorities, etc. The content of the ADUs being the same or different is not limited in the embodiments of the present disclosure.

The association relationship, the association number, and the time staring point, the arriving time, the period of the association may refer to the illustration in the above embodiment, which are not repeated herein.

In the above embodiment, since the association information of the ADUs acquired by the core network device may include any one of information involved in the actual applications, for any case, the associated ADUs may be ensured to be processed or be processed synchronously based on the acquired ADU association information, such that a whole business transmission demand may be achieved.

In order to ensure to accurately process or synchronously process the ADUs, in addition to acquiring the ADU association information, the core network device may also acquire ADU-association-control demand information. In some embodiments, the ADU-association-control demand information is carried in the first information. Understandably, the ADU-association-control demand information may be carried in the first information of the above embodiment, or may also be acquired alone, which is not limited in the embodiment of the present disclosure.

The ADU-association-control demand information refers to a concrete control demand for the ADU association, or a concrete control demand during the ADUs being associated. For example, the association information of the ADUs is that the arriving time of the first ADU is associated with the arriving time of the second ADU. The association control demand information then may be that the arriving time of the first ADU and the arriving time of the at least one second ADU are required to be the same.

In an embodiment, the ADU-association-control demand information includes at least one of the associated ADUs being required to be sent to the UE simultaneously, the associated ADUs being required to arrive at the UE simultaneously, the associated ADUs being required to arrive at the UE adjacently in sequence, a maximum time interval of the associated ADUs arriving at the UE, an earliest time of the associated ADUs arriving at the UE, a latest time of the associated ADUs arriving at the UE, and a data transmission demand of taking associated ADUs as a whole.

In this embodiment, a DL data transmission process is taken as an example, when the association information is one or more time point at which the associated ADUs start to be associated, the ADU-association-control demand information may be that the associated ADUs are required to be sent to the UE simultaneously. When the association information is one or more arriving time of the associated ADUs, the ADU-association-control demand information may be that the associated ADUs are required to arrive at the UE simultaneously, or that the associated ADUs are required to arrive at the UE adjacently in sequence, or may be the maximum time interval of the associated ADUs arriving at the UE, or may be the earliest time of the associated ADUs arriving at the UE, or the latest time of the associated ADUs arriving at the UE. When the association information is one or more transmission period of the associated ADUs, the ADU-association-control demand information may be the data transmission demand of taking associated ADUs as a whole.

Based on the above ADU-association-control demand information, concrete control information when the ADUs are associated may be straightforward determined, such that a problem of the data frames being not synchronous may be avoided when the data pocket is processed or synchronously processed based on the association information of the ADUs.

As shown in FIG. 4, FIG. 4 illustrates the core network device acquiring the ADU-association-control demand information and a process of data processing performed after the ADU-association-control demand information is acquired.

In an embodiment, the ADU-association-control demand information being acquired described above includes receiving the ADU-association-control demand information sent by the device of the (Application Function) AF.

Taking the device of the AF being the APP as an example, in the actual applications, the APP configures the ADU association information for the data transmission demand and sends the ADU association information as the first information to the core network device.

In some embodiments, the application function may also come from the UE side. In FIG. 4, the UE may directly acquire the ADU-association-control demand information in the current data transmission process based on configured information and takes both the ADU-association-control demand information and the ADU association information together as the first information, or sends the ADU-association-control demand information alone to the core network device.

In an embodiment, after acquiring the ADU-association-control demand information, the core network device may determine an ADU-association-control parameter based on the ADU-association-control demand information. In another embodiment, the core network device may send the ADU-association-control parameter to the base station.

As shown in FIG. 4, after acquiring the ADU-association-control demand information, the core network device may determine the ADU-association-control parameter based on the ADU-association-control demand information and send a determined ADU-association-control parameter to the base station, such that the base station may schedule the sent data pocket, allocate the resources, or guarantee the demand of sending the associated ADUs as the whole.

The ADU-association-control parameter is a concrete parameter value corresponding to the ADU-association-control demand information. For example, the ADU-association-control demand information is the maximum time interval of the associated ADU arriving at the UE, then the ADU-association-control parameter is a concrete value of the maximum time interval, e.g., 3 ms. Alternatively, the ADU-association-control demand information is the latest time of the associated ADU arriving at the UE, then the ADU-association-control parameter is a concrete value of the latest time, e.g., arriving at the $4^{th}$ second.

In some embodiments, a manner of the core network device determining the ADU-association-control parameter based on the ADU-association-control demand information may be determining based on historical empirical values, or to receive the ADU-association-control parameter sent by the AF (the application function APP or the device of the application function). The manner of determining the ADU-association-control parameter based on the ADU-association-control demand information is not limited in the embodiments of the present disclosure.

In the above embodiment, after acquiring the ADU-association-control demand information, a corresponding ADU-association-control parameter may be determined based on the ADU-association-control demand information, and the ADU-association-control parameter may be sent to the base station, which may enable the base station to schedule the sent data packet, and allocate the resources based on the ADU-association-control parameter, such that transmission data may be ensured to be processed or synchronously processed. In this way, the quality of the data transmission is improved.

A process of the core network device processing based on the ADU association information in the first information after reserving the first information and sending processed information to the base station is illustrated in the following.

Figure 5:
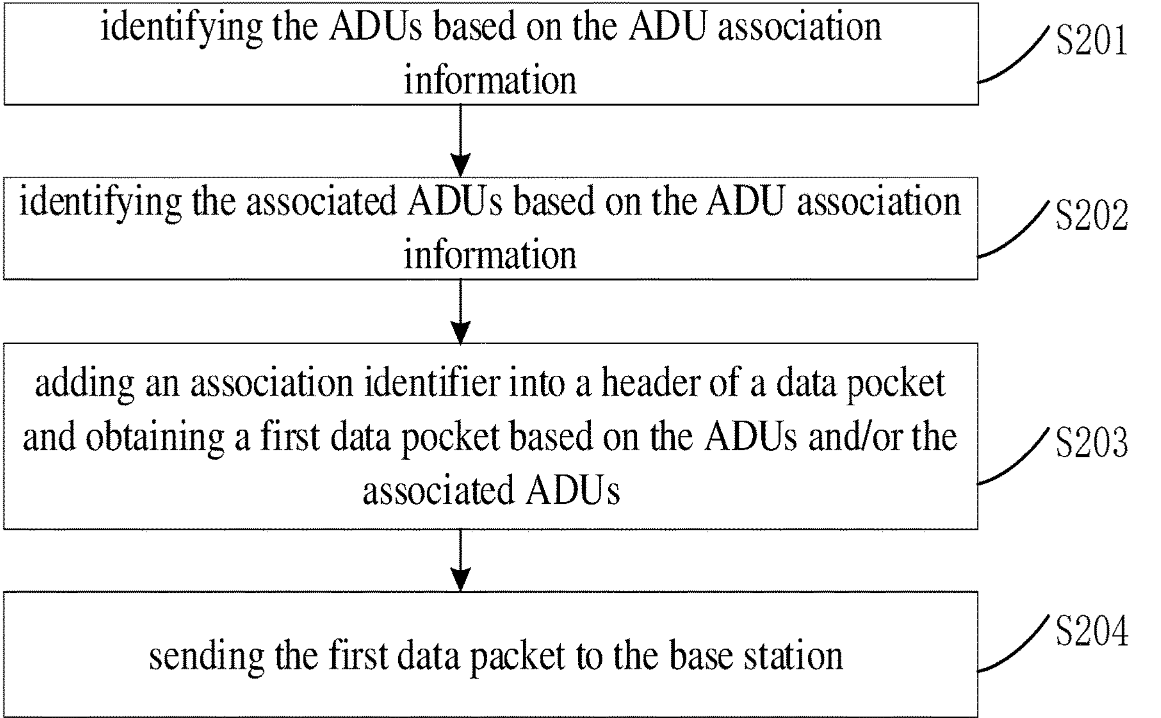
FIG. 5 is a schematic flowchart of an ADU association method according to another embodiment.

In an embodiment, as shown in FIG. 5, the process of the core network device processing the ADU association information may include at least one of operations S201-S204.

In an operation S201, the process includes identifying the ADUs based on the ADU association information.

In an operation S202, the process includes identifying the associated ADUs based on the ADU association information.

In an operation S203, the process includes adding association identifiers into a header of a data pocket and obtaining a first data pocket based on the ADUs and/or the associated ADUs.

In an operation S204, the process includes sending the first data packet to the base station.

In this embodiment, the ADU association information received by the core network device may only include the ADU association information, or only include the ADU-association-control parameter, or include both the ADU association information and the ADU-association-control parameter, which is not limited in the present disclosure.

The core network device may identify corresponding ADUs and identify the associated ADUs based on the acquired ADU association information. For example, the ADU association information indicates that the arriving time of the first ADU is associated with the arriving time of the second ADU, the core network device may then identify which one is each of the first ADU and the second ADU, and may also identify association information between the first ADU and the second ADU.

A data pocket obtained after the core network device adds the association identifier into the header of the data pocket based on identified ADUs and associated ADUs is referred to as the first data pocket. Subsequently, the core network device sends the first data pocket to the base station.

In some embodiments, an association identifier includes an identifier of the first ADU and the second ADU being associated.

The association identifier includes the identifier of the first ADU and the second ADU being associated. Further, one association identifier may be configured to correspond to one association relationship. The core network device and the base station may agree that, e.g., the identifier is represented by "flag", then "flag1" corresponds to an arriving time point of the first ADU and an arriving time point of the second ADU being the same, such that after the base station receives the "flag1", the base station is clearly aware of the "flag1" indicating that the arriving time point of the first ADU and the arriving time point of the second ADU are the same.

Of course, in addition to including the above identifier "flag", in some embodiments, the association identifier may also include any one of an indication of the ADUs being the associated ADUs, numerals of the associated ADUs, a same Sequence Number (SN), and consecutive SNs.

For example, the indication of the associated ADUs explicitly indicates that the first ADU is associated with the second ADU. The numerals of the associated ADUs include numerals of the first ADU and the second ADU which are associated. Taking the indication of the associated ADUs as an example, an indication bit indicates as "true" or "associated", indicating that the ADUs are the associated ADUs.

In terms of a same Serial Number (SN) or the consecutive SNs, for example, an ADU arranged in the $N^{th}$ position is associated with an ADU arranged in the $M^{th}$ position in an entire data sequence. The serial number is the same with the sequence number mentioned above, both the serial number and the sequence number are referred to as SN for short.

The data pocket obtained after the core network device adds the association identifier into the header of the data pocket is referred to as the first data pocket. The core network device sends the first data pocket to the base station.

The header of an obtained first data packet includes, in addition to the association information enumerated above, in an embodiment, the header of the first data packet further includes the identification information of the first ADU.

The header of the first data pocket includes the identification information of the first ADU, which is equivalent to the identification information of the first ADU being sent to the base station. In this way, after receiving the data pocket, the base station may quickly and accurately locate the first ADU and determines information of the second ADU associated with the first ADU. In some embodiments, the base station may be informed in advance. Of course, in addition to informing the base station of the identification information of the first ADU, in an embodiment, the number of the associated ADUs may be sent to the base station, or be indicated in the header of the first data pocket for a quick access of the base station. In some embodiments, the number of the associated ADUs may be sent to the base station in advance to inform the base station of the associated ADUs.

For the above-described case where the header of the first data packet includes the consecutive SNs of the associated ADUs, in an embodiment, if the association identifier includes the consecutive SNs of the associated ADUs, the header of the first data packet further includes a starting SN and/or the number of associated SNs. That is, the starting SN and/or the number of the associated SNs are required to sent to the base station. For example, the starting SN may be indicated to the base station through the header of the data pocket, or may also be directly sent to the base station alone, which is not limited in the embodiments of the present disclosure. In some embodiments, the base station may be informed in advance.

In some embodiments, if the association identifier includes the consecutive SNs of the associated ADUs, the header of the first data pocket further includes an ending SN and/or the number of the associated SNs.

As mentioned in previous embodiments, the core network device includes at least one of functional units such as the PCF, the SMF, the UPF, etc. A process of the core network device adding the association identifier into the header of the data pocket to obtain the first data pocket and sending the first data pocket to the base station may be implemented by various functional units in the core network device.

Figure 6:
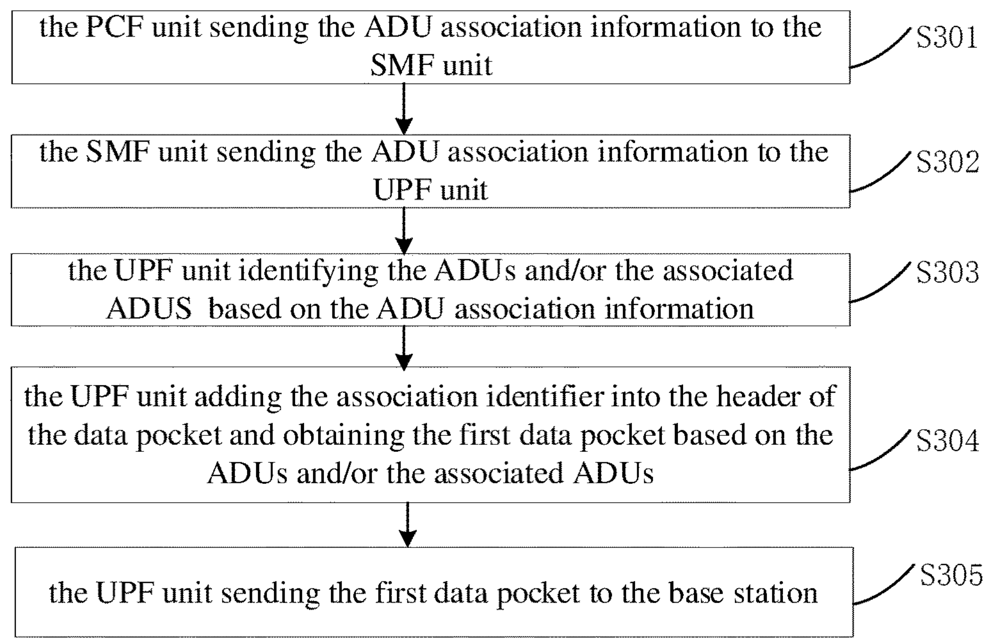
FIG. 6 is a schematic flowchart of an ADU association method according to another embodiment.

As shown in FIG. 6, in an embodiment, a process of the various functional units of the core network device generating the first data pocket and sending the first data pocket to the base station includes at least one of operations S301-S305.

In an operation S301, the process includes the PCF unit sending the ADU association information to the SMF unit.

In an operation S302, the process includes the SMF unit sending the ADU association information to the UPF unit.

In an operation S303, the process includes the UPF unit identifying the ADUs and/or the associated ADUs based on the ADU association information.

In an operation S304, the process includes the UPF unit adding the association identifier into the header of the data pocket to obtain the first data pocket based on the ADUs and/or the associated ADUs.

In an operation S305, the process includes the UPF unit sending the first data pocket to the base station.

In any one of the embodiments describe above, when the core network device acquires the first information, the first information substantially first arrives at the PCF unit in the core network device. The PCF unit then may send the ADU association information in the first information to the SMF unit in the core network device. After receiving the ADU association information, the SMF unit continues to send the ADU association information to the UPF unit. The UPF unit then performs an operation of identifying the ADUs and/or the associated ADUs based on the ADU association information and adds the association identifier to the header of the data packet to obtain the first data packet. Ultimately, the UPF unit sends an obtained first data packet to the base station. In the actual applications, in different scenarios, the various functional units in the core network device may simply perform at least one operation according to actual needs, which is not limited in the embodiments of the present disclosure.

Figure 7:
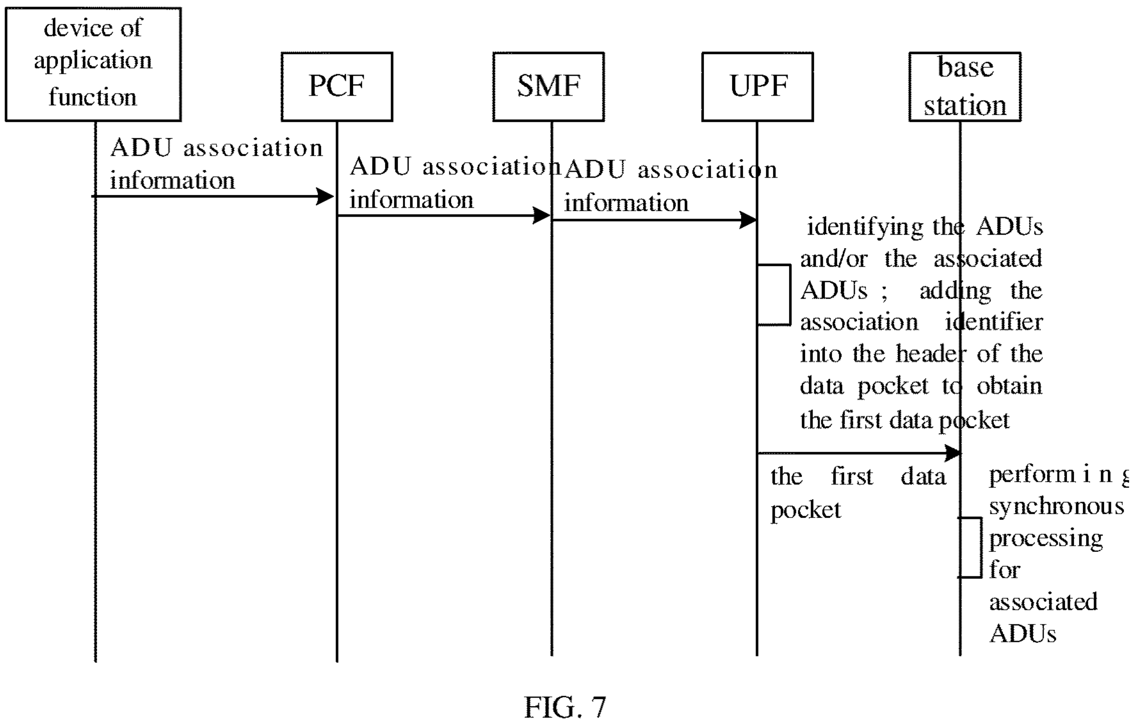
FIG. 7 is a schematic view of flow exchanging of an ADU association method according to another embodiment.

As shown in FIG. 7, in combination of the device of the AF, the PCF unit, the SMF unit, the UPF unit of the core network device, and the base station, FIG. 7 illustrates a schematic flowchart of acquiring the first information including the ADU association information and sending the first information to the base station. The PCF unit, the SMF unit, and the UPF unit may be laid out in the same core network device or in different core network devices, respectively, which is not limited in the embodiments of the present disclosure.

The association information itself indicates that the plurality of ADUs may have associations in aspect of information or processing. Thus, in the above embodiments, when the UPF unit identifies the ADUs and/or the associated ADUs based on the ADU association information, adds the association identifier to the header of the data packet to obtain the first data packet, and sends the first data packet to the base station, concrete association information of the ADUs is required to be considered and the associated ADUs are required to be processed. In some embodiments, the base station is required to perform the synchronous processing for the associated ADUs.

Figure 8:
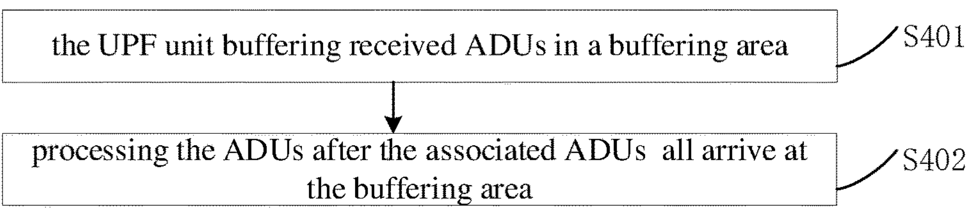
FIG. 8 is a schematic flowchart of an ADU association method according to another embodiment.

In an embodiment, as shown in FIG. 8, the embodiment includes at least one of operations S401-S402.

In an operation S401, the embodiment includes the UPF unit buffering received ADUs in a buffer area.

In an operation S402, the embodiment includes processing the ADUs after the associated ADUs all arrive at the buffer area.

An appropriate buffer area is developed in the UPF unit for data buffering, the UPF unit buffers the ADUs received at different moments to this buffer area. If an ADU carrying the association information exists in received ADUs, the UPF unit is required to wait for the associated ADUs all arrive at this buffer area and then perform processing for the associated ADUs. In some embodiments, the synchronous processing may be performed for the ADUs. In this way, the UPF unit processes the associated ADUs as the whole, which ensures that the associated ADUs are processed simultaneously, or avoids a situation of a frame absence and a frame leakage of a final video stream caused by one or more associated ADUs being processed alone. In this way, the quality of the data transmission may be improved.

In some embodiments, the received ADUs may also be buffered by the SMF unit into the buffer area. After the associated ADUs all arrive at the buffer area, the SMF unit processes the ADUs.

In an embodiment, an operation of processing the ADUs includes at least one of sending the associated ADUs to the base station, adding the ADU association information to the first data packet, and generating the first data packet based on the associated ADUs.

The process performed by the UPF unit includes identifying the ADUs and/or the associated ADUs based on the ADU association information, and adding the association identifier into the header of the data packet to obtain the first data packet, and sending the first data packet to the base station. However, in the actual applications, in the different scenarios, the UPF unit is simply required to perform at least one of sending the associated ADUs to the base station, adding the ADU association information into the first data packet, and generating the first data packet based on the associated ADUs, as long as the actual needs are satisfied, which is not limited in the embodiments of the present disclosure.

In addition, a process of the UPF unit performing identifying the ADUs and/or the associated ADUs based on the ADU association information, and adding the association identifier into the header of the data packet to obtain the first data packet, and sending the first data packet to the base station is illustrated in the above embodiments. However, in the actual applications, this process may also be performed in the SMF unit according the actual needs. A process of the SMF unit performing identifying the ADUs and/or the associated ADUs based on the ADU association information, and adding the association identifier into the header of the data packet to obtain the first data packet, and sending the first data packet to the base station has a similar principle as the process performed by the UPF unit, which is not repeated herein.

After the first data packet is sent to the base station and the base station receiving the first data packet, the base station may determine the associated ADUs based on header information (such as the association identifier) of the first data pocket and then process the associated ADUs. In some embodiments, the base station may perform the synchronous processing for the associated ADUs.

For example, an operation of the base station processing or synchronously processing the associated ADUs may be scheduling the associated ADUs, allocating the resources, and guaranteeing the demand of sending the whole. For example, for two ADUs having an arriving requirement, the two ADUs may be ensured to arrive at the UE simultaneously, or adjacently, or within a particular time period. Alternatively, the plurality of associated ADUs may be sent as the whole, such that aspects such as the time delay, the code error rate, etc., may obtain transmission assurance. In this way, the time delay and the code error rate of transmission may be reduced.

Figure 9:
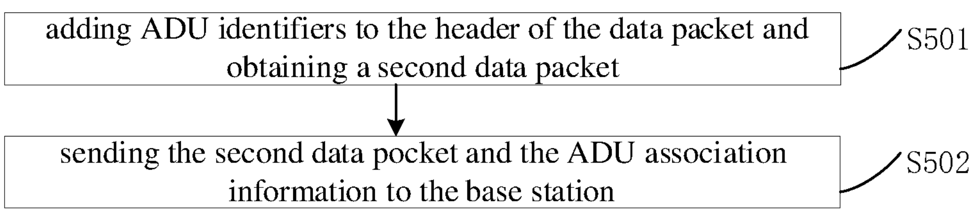
FIG. 9 is a schematic flowchart of an ADU association method according to another embodiment.

In another embodiment, as shown in FIG. 9, the process of the core network device processing the ADU association information includes at least one of operations S501-S502.

In an operation S501, the process includes adding ADU identifiers to the header of the data packet and obtaining a second data packet.

In an operation S502, the process includes sending the second data pocket and the ADU association information to the base station.

Similarly, in this embodiment, the ADU association information received by the core network device may only include the ADU association information, or only include the ADU-association-control parameter, or include both the ADU association information and the ADU-association-control parameter, which is not limited.

A difference between this embodiment and the embodiment of FIG. 5 above is that in this embodiment, after the core network device acquiring the first information and identifying the ADUs based on the ADU association information in the first information, identifiers of identified ADUs are added into the header of the data packet, an obtained data pocket thereby is referred to as the second data pocket, and the second data pocket is sent to the base station. The ADU identifiers may be configured to identify which one is each of the ADUs, and the ADU association information may be configured to determine one or more association between various identified ADUs.

It is noted that the second data packet and the ADU association information may be indicated to the base station by the same core network device, or may be indicated to the base station by different core network devices.

For example, the identifiers added by the core network device into the header of the second data packet are an ADU1 and an ADU2. Meanwhile, the ADU association information indicates that the ADU1 is associated with the ADU2 or the ADU1 and the ADU2 having the same time of arriving at the UE are associated. After the core network device sends the ADU association information to the base station, the base station may directly identify that the ADU1 is associated with the ADU2, or that the ADU1 and the ADU2 having the same time of arriving at the UE are associated. The base station then may process the ADU1 and the ADU2.

For another example, the ADU association information indicates that a time of the ADU1 arriving at the UE and a time of the ADU2 arriving at the UE are required to be the same. After the core network device sends the ADU association information to the base station, the base station may process the ADU1 and the ADU2 to render the time of the ADU1 finally arriving at the UE and the time of the ADU2 finally arriving at the UE to be the same. In some embodiments, the base station may perform the synchronous processing for the ADU1 and the ADU2.

Figure 10:
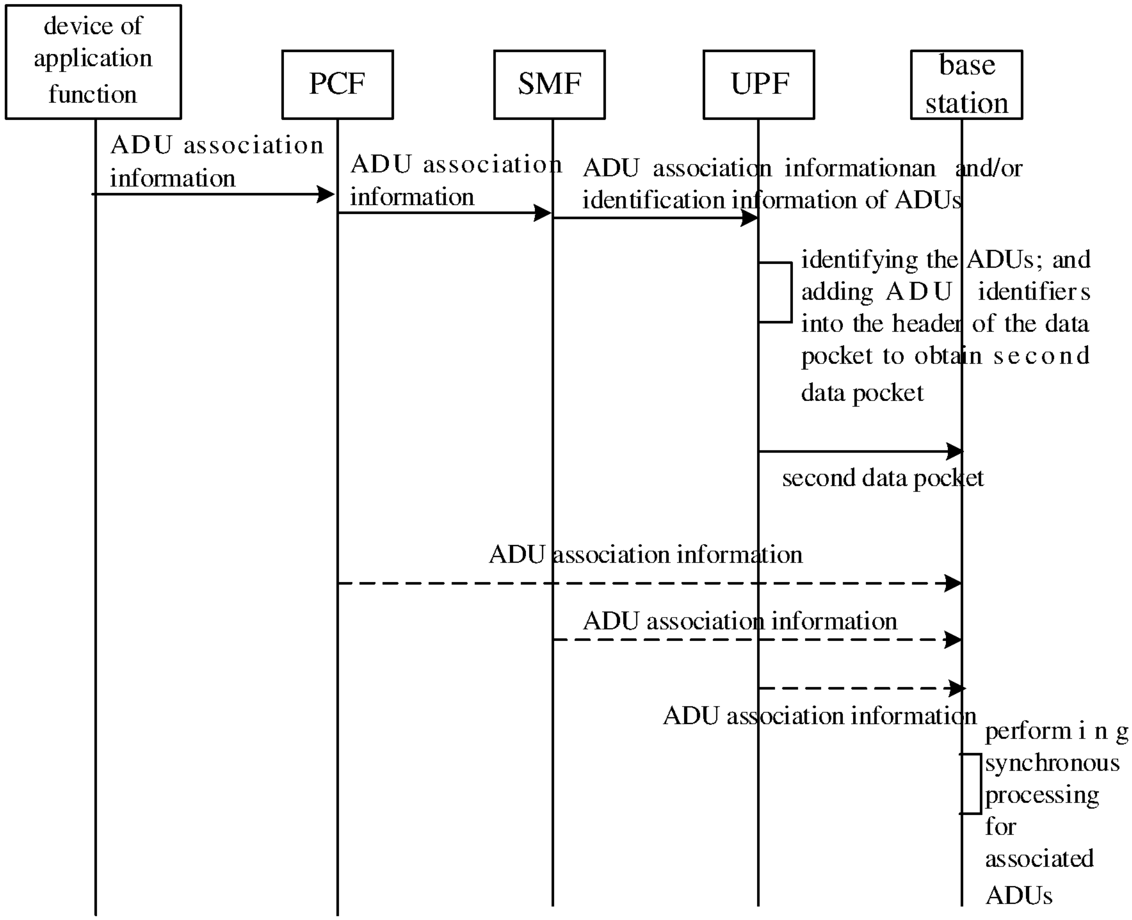
FIG. 10 is schematic view of flow exchanging of an ADU association method according to another embodiment.

As shown in FIG. 10, based on the functional units in the core network device, i.e., the PCF unit, the SMF unit, and the UPF unit, another flowchart of acquiring the first information including the ADU association information and sending the first information to the base station is illustrated. A process of the various functional units in the core network device generating the second data pocket and sending the second data pocket to the base station includes at least one of the PCF unit sending the ADU association information to the SMF unit, the SMF unit sending the ADU association information and/or identification information of the ADUs to the UPF unit, the UPF unit adding the ADU identifiers to the header of the data packet to obtain the second data packet, the UPF unit sending the second data packet to the base station, and the AMF or SMF or UPF unit sending the ADU association information to the base station.

When the core network device acquires the first information, the PCF unit may send the ADU association information in the first information to the SMF unit. After receiving the ADU association information, the SMF unit send at least one of the ADU association information and the identification information of the ADUs to the UPF unit. The UPF unit may identify the ADUs based on the identification information of the ADUs and/or the ADU association information, and add the ADU identifiers to the header of the data packet to obtain the second data packet. Ultimately, the UPF unit sends the second data packet to the base station. In some embodiments, the SMF unit may also send the ADU association information to the base station, so as to facilitate the base station to be informed of the ADU association information. For example, before the UPF unit sends the second data packet to the base station, the SMF unit may send the ADU association information to the base station.

For example, when the UPF units identifies the ADUs based on the ADU identification information and/or the ADU association information, ADU1 identifier information indicates as the I frame, and the I frame is associated with the ADU2, the ADU2 then may be determined to be the P frame.

When the core network device acquires the first information, the PCF unit may send the ADU association information in the first information to the SMF unit. After receiving the ADU association information, the SMF unit sends at least one of the ADU association information and the identification information of the ADUs to the UPF unit. The UPF unit may identify the associated ADUs based on the identification information of the ADUs and/or the ADU association information and add the ADU identifiers to the header of the data packet to obtain the second data packet. Ultimately, the UPF unit sends the second data packet and the ADU association information to the base station.

For example, when the UPF unit identifies the ADUs based on the identification information of the ADUs and/or the ADU association information, the ADU1 identifier information indicates as the I frame, and the I frame is associated with the ADU2. The ADU2 may then be determined to be the P frame.

In some embodiments, when the UPF unit adds the ADU identifiers in the header of the data packet, alternative identifiers rather than original identifiers of the ADUs may be added. The original identifiers refer to the identifiers coming with the ADUs, and the alternative identifiers refer to identifiers reassigned for the ADUs. In some embodiments, the SMF unit sends the alternative identifiers to the base station and informs the base station of which kind of ADU each of the alternative identifiers corresponding to.

In some embodiments, the UPF unit is not required to be indicated the ADU association information.

Since the AMF unit or the SMF unit or the UPF unit receives the ADU association information, any one of the AMF unit or the SMF unit or the UPF unit may send the ADU association information to the base station, such that the base station may receive the ADU association information and the second data pocket of which the header including the ADU identifiers. The base station receives the second data pocket, and may determines the associated ADUs based on the ADU identifiers in the header information of the second data pocket and the ADU association information.

The base station then processes the associated ADUs. In some embodiments, the base station may perform the synchronous processing for the associated ADUs. The processing performed by the base station for the associated ADUs may refer to the illustration in the embodiments described above, which is not repeated herein.

Similarly, in the above embodiments, in the different scenarios, the various functional units of the core network device may only perform at least one of the above operations according to the actual needs, which is not limited in the embodiments of the present disclosure.

In this embodiment, the association information is sent to the base station alone through the AMF or SMF or UPF unit, and the identification information of the ADUs is sent to the UPF unit, such that the associated ADUs are ensured to be processed synchronously and the whole business transmission demand is achieved.

In another embodiment, the process of the core network device processing the ADU association information may also include sending the ADU association information to the base station.

Similarly, in this embodiment, the ADU association information received by the core network device may only include the ADU association information, or only include the ADU-association-control parameter, or include both the ADU association information and the ADU-association-control parameter, which is not limited.

A difference between this embodiment and embodiments of FIGS. 5 and 9 described above is that after the core network device in this embodiment acquires the first information, the core network device directly sends the ADU association information in the first information to the base station. In this way, the base station may determine each associated ADU and concrete association information based on the ADU association information.

For example, the ADU association information indicates that the ADU1 is associated with the ADU2, or the ADU1 and the ADU2 having the same time of arriving at the UE are associated. After the core network device sends the ADU association information to the base station, the base station may directly identify that the ADU1 is associated with the ADU2, or that the ADU1 and ADU2 having the same time of arriving at the UE are associated. The base station then may perform the synchronous processing for the ADU1 and the ADU2.

For another example, the ADU association information indicates that the time of the ADU1 arriving at the UE and the time of the ADU2 arriving at the UE are required to be the same. After the core network device sends the ADU association information to the base station, the base station may process the ADU1 and the ADU2 to render the time of the ADU1 finally arriving at the UE and the time of the ADU2 finally arriving at the UE to be the same. In some embodiments, the base station may perform the synchronous processing for the ADU1 and the ADU2.

Figure 11:
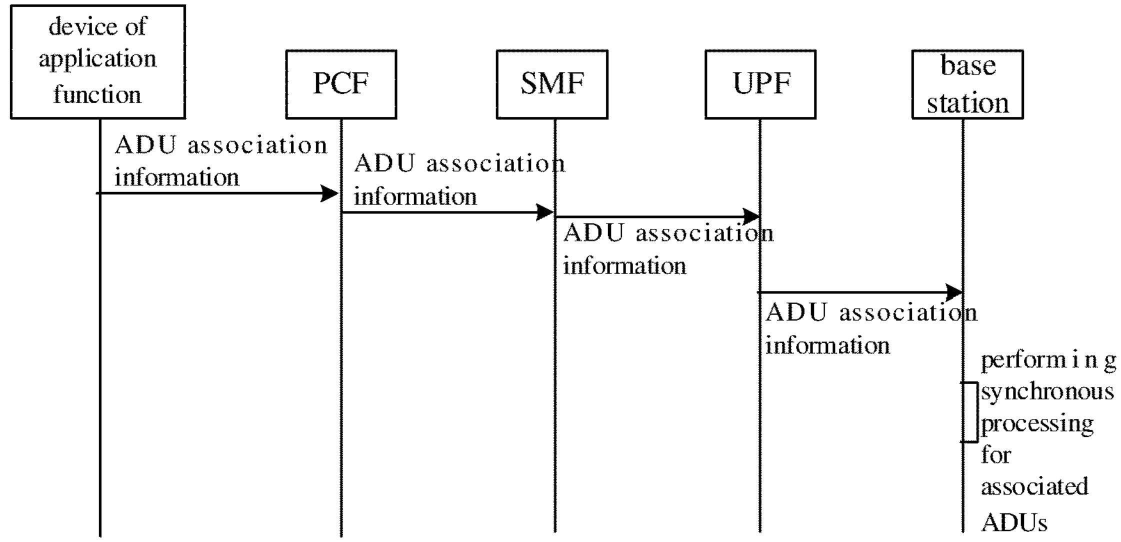
FIG. 11 is schematic view of flow exchanging of an ADU association method according to another embodiment.

As shown in FIG. 11, based on the functional units in the core network device, i.e., the PCF unit, the SMF unit, and the UPF unit, another flowchart of acquiring the first information including the ADU association information and sending the first information to the base station is illustrated. A process of the core network device sending the ADU association information to the base station includes the PCF unit sending the ADU association information to the SMF unit, and/or the SMF unit sending the ADU association information to the base station.

In this embodiment, after the core network device acquires the first information from the device of the AF, the PCF unit may send the ADU association information in the first information to the SMF unit, and/or the SMF unit sends the ADU association information to the base station. In the actual applications, an operation of the PCF unit sending the ADU association information to the SMF unit and an operation of the SMF unit sending the ADU association information to the base station, both of which may be performed or only any one of which may be performed according to the actual needs.

Whereas the base station receives the ADU association information, the base station may determine the associated ADUs based on the ADU association information and then process the associated ADUs. In some embodiments, the base station may perform the synchronous processing for the associated ADUs. The processing performed by the base station for the associated ADUs may refer to illustration of the foregoing embodiments, which is not repeated herein. In this embodiment, the association information is directly sent to the base station, and the associated ADUs are directly processed by the base station, which avoids an operation of the UPF unit for the header of the data header, such that the resources of the core network device may be saved and the associated ADUs may also be ensured to be processed synchronously. In this way, the whole business transmission demand may be achieved.

In the process of sending the ADU association information to the base station in the embodiment of FIG. 11, the concrete association information of the ADUs may also be considered. The associated ADUs are required to be processed or synchronously processed. In an embodiment, the process of sending the ADU association information to the base station also includes at least one of the UPF unit buffering the received ADUs in the buffer area and processing the ADUs after the associated ADUs all arrive at the buffer area.

In this embodiment, the appropriate buffer area is also required to be developed in the UPF unit for the data buffering. The UPF unit buffers the ADUs received at the different moments to this buffer area. When receiving the ADU carrying the association information among the received ADUs, the UPF unit is required to wait for the associated ADUs to all arrive at this buffer area and then process the ADUs. In this embodiment, the processing performed by the UPF unit for the associated ADUs includes the PCF unit sending the ADU association information to the SMF unit or other operations, which is not limited in the embodiments of the present disclosure.

In some embodiments, the SMF unit may also buffer the received ADUs in the buffer area and processing the ADUs after the associated ADUs all arrive at the buffer area. In some embodiments, the synchronous processing may be performed for the associated ADUs.

In this embodiment, the UPF units processes the whole of the associated ADUs synchronously, which avoids the situation of the frame absence and the frame leakage of the final video stream caused by one or more associated ADUs being processed alone. In this way, the quality of the data transmission may be improved.

An association method performed by the base station as the executing entity is illustrated through some embodiments in the following. It is noted that the ADU association method performed at a base station side has been illustrated in the embodiments of the ADU association method preformed at a core network device side. Each of the following embodiments will provide brief description, and repeated contents are not repeated and may refer to the foregoing embodiments.

In an embodiment, the ADU association method is provided. This embodiment includes acquiring second information, and the second information being configured to indicate the associated ADUs.

In some embodiments, a manner of the base station acquiring the second information including the core network device receiving the second information, as the second information is configured to indicate the associated ADUs. For example, the ADU association information includes that the first ADU and the second ADU are required to be sent simultaneously, or arrive simultaneously, or arrive within the preset duration, and the like. Therefore, after acquiring the second information, the base station may determine the associated ADUs and the concrete association information of the associated ADUs based on the second information, so as to perform processes such as resource scheduling, allocating, synchronous transmission, for the associated ADUs based on the concrete association information of the associated ADUs. Equivalently, the base station may determine the association information of the ADUs based on the acquired second information, such that the base station may schedule the sent data pocket, allocate the resources, and guarantee the demand of sending the associated ADUs as the whole. In this way, the data frames having the association relationship may be processed synchronously, the transmission data pocket may be ensured to be accurately and completely decoded and the audio and the video may be ensured to be played synchronously, such that the quality of the data transmission may be improved.

In an embodiment, the second information is configured to perform at least one of identifying the ADUs, indicating the associated ADUs, indicating the ADU-association-controls, and processing the associated ADUs.

The identifying the ADUs, indicating the associated ADUs, indicating the ADU-association-controls, and processing the associated ADUs may refer to the illustration in the foregoing embodiments. In the actual applications, the second information may indicate at least one of the above operations, such that after receiving the second information, the base station may correspondingly perform the at least one of the above operations in conjunction with the second information. For example, the base station may identify the ADUs, determine the associated information of the associated ADUs, and determine associated control information of the ADUs. Alternatively, the base station may perform the processes, such as scheduling the associated ADUS, resource allocating, and the like. In some embodiments, the base station may perform the synchronous processing for the associated ADUs.

In an embodiment, the second information includes the first data packet. The header of the first data pocket includes an the ADU identifiers and/or an ADU association identifier. In some embodiments, the association identifiers are determined based on the ADU association information. In some embodiments, the association identifier includes the identifier of the first ADU and the second ADU being associated. In some embodiments, the header of the first data packet further includes the identification information of the first ADU. In some embodiments, the association identifier includes any one of the numerals of the associated ADUs, the same SN, and the consecutive SNs. In some embodiments, if the association identifier includes the consecutive SNs of the associated ADUs, the header of the first data pocket further includes the starting SN and/or the number of the associated SNs.

The first data packet is the data packet obtained after the core network device adds the association identifier into the header of the data packet based on the identified ADUs and associated ADUs from received first information. The process of the core network device generating the first data packet and related illustration of the first data packet may refer to the embodiments at the core network device side, which are not repeated herein.

In an embodiment, after the base station receiving the first data packet in the second information, the base station may further perform at least one of determining the associated ADUs based on the ADU identifiers and/or the association identifier and performing the data processing for the associated ADUs.

After receiving the first data packet, the base station may determine the associated ADU based on the header information (such as the ADU identifiers and/or the association identifier) of the first data pocket and then process the associated ADUs. In some embodiments, the base station may perform the synchronous processing for the associated ADUs.

For example, the operation of the base station processing the associated ADUs may be scheduling the associated ADUs, allocating the resources, and guaranteeing the demand of sending the whole. For example, for the two ADUs having the arriving requirement, the two ADUs may be ensured to arrive at the UE simultaneously, or adjacently, or within the particular time period. Alternatively, the plurality of associated ADUs may be sent as the whole, such that aspects such as the time delay, the delay budget, the code error rate, etc., may obtain the transmission assurance. In this way, the time delay and the code error rate of transmission may be reduced.

In another embodiment, the second information includes the ADU association information.

The ADU association information in the first information is carried in the second information to be sent to the base station after the core network device acquires the first information. The core network device may send the ADU association information to the base station through different functional units such as the AMF unit or the SMF unit or the UPF unit, and a sending process may refer to the description of the embodiments at the core network device side and is not repeated herein.

In actual scenarios, the ADU association information may be distinguished based on indicated contents, concrete association objects thereof, and concrete indicated association items, which may refer to the following embodiments.

In an embodiment, the ADU association information is configured to indicate at least one of the association information between the different ADUs, the identification information of the different ADUs, and the identifier information of the ADUs.

In an embodiment, the association information between the ADUs includes at least one of the association information between the frames, the association information between the encoded chips, the association relationship between different the data flows, and the association relationship between the different QoS flows.

In an embodiment, the association information between the ADUs includes the at least one of one or more association relationship between the first ADU and at least one second ADU, the number of the associations between the first ADU and the at least one second ADU, the one or more time point at which the first ADU and the at least one second ADU start to be associated, the one or more time at which the first ADU and the at least one second ADU associated with the first ADU arrive, and the one or more association period of the first ADU and the at least one second ADU.

The at least one second ADU includes the same ADU, or the at least one second ADU includes the different ADUs.

In an embodiment, the identification information of the different ADUs includes at least one of the ADU identifiers, the ADU periods, the data arriving times of the ADUs, the data arriving offsets of the ADUs, and the pocket sizes of the ADUs, and the IP five-tuples.

In an embodiment, the ADU association information is configured to indicate at least one of the one or more association relationship between the first ADU and the at least one second ADU, the number of the associations between the first ADU and the at least one second ADU, the one or more time point at which the first ADU and the at least one second ADU start to be associated, the one or more time at which the first ADU and the at least one second ADU associated with the first ADU arrive, and the one or more association period of the first ADU and the at least one second ADU.

The at least one second ADU includes the same ADU, or the at least one second ADU includes the different ADUs.

The illustration of a principle and effects of each embodiment of the ADU association information may refer to the embodiments of the core network device side, which is not repeated herein.

In an embodiment, after receiving the second information, the base station may perform an operation of determining the associated ADUs based on the ADU association information.

That is, after receiving the ADU association information in the second information, the base station may determine each of associated ADU based on the ADU association information and the concrete association information.

For example, the ADU association information indicates that the ADU1 is associated with the ADU2, or that the ADU1 and the ADU2 having the same time of arriving at the UE are associated. The base station then may process the ADU1 and the ADU2. Further, the processing performed by the base station for the ADU1 and the ADU2 may be the synchronous processing.

For another example, the ADU association information indicates that the time of the ADU1 arriving at the UE and the time of the ADU2 arriving at the UE are required to be the same. After the core network device sends the ADU association information to the base station, the base station may process the ADU1 and the ADU2 to render the time of the ADU1 finally arriving at the UE and the time of the ADU2 finally arriving at the UE to be the same. Further, the processing performed by the base station for the ADU1 and the ADU2 may be the synchronous processing.

The base station determining the associated ADUs based on the ADU association information may include two implementation manners.

In an embodiment, an operation of determining the associated ADUs based on the ADU association information includes determining the associated ADUs based on the ADU association information and ADU identifiers in a third data pocket.

The third data pocket may be a data pocket generated after the core network device adds the ADU identifiers determined based on the received first information into the header of the data pocket. A forming process of the third data pocket may also refer to the illustration of the core network device side, which is not repeated herein.

The base station determines the associated ADUs and the association information of the associated ADUs based on the ADU association information and the ADU identifiers in the third data pocket.

In another embodiment, the operation of determining the associated ADUs based on the ADU association information includes determining the associated ADUs based on the ADU association information and a fourth data pocket. The fourth data pocket is a data pocket sent by the core network device to the base station.

Based on the associated ADUs, in an embodiment, the base station performs the data processing for the associated ADUs. In some embodiments, the base station performs the synchronous processing for the associated ADUs.

The base station processes the associated ADUs, which may be scheduling the associated ADUs, resource allocating, and guaranteeing the demand of sending the whole. For example, for the two ADUs having the arriving requirement, the two ADUs may be ensured to arrive at the UE simultaneously, or adjacently, or within the particular time period. Alternatively, the plurality of associated ADUs may be sent as the whole, such that the aspects such as the time delay, the code error rate, etc., may obtain the transmission assurance. In this way, the time delay and the code error rate of transmission may be reduced.

Of course, in order to ensure to accurately process the associated ADUs and send the whole, in addition to the ADU association information described above, in an embodiment, the base station may acquire the ADU-association-control parameter.

In an embodiment, the ADU-association-control parameter may be determined based on the ADU-association-control demand information.

The ADU-association-control demand information refers to the concrete control demand during the ADUs being associated. For example, the association information of the ADUs is that the arriving time of the first ADU is associated with the arriving time of the second ADU. The association control demand information then may be that the arriving time of the first ADU and the arriving time of the at least one second ADU are required to be the same.

The ADU-association-control parameter is the concrete parameter value corresponding to the ADU-association-control demand information. For example, the ADU-association-control demand information is the maximum time interval of the associated ADU arriving at the UE, then the ADU-association-control parameter is the concrete value of the maximum time interval, e.g., 3 ms. Alternatively, the ADU-association-control demand information is the latest time of the associated ADU arriving at the UE, then the ADU-association-control parameter is the concrete value of the latest time, e.g., arriving at the 4$^{th}$ second.

In an embodiment, the ADU-association-control demand information includes at least one of the associated ADUs being required to be sent to the UE simultaneously, the associated ADUs being required to arrive at the UE simultaneously, the associated ADUs being required to arrive at the UE adjacently in sequence, the maximum time interval of the associated ADUs arriving at the UE, the earliest time of the associated ADUs arriving at the UE, the latest time of the associated ADUs arriving at the UE, and the data transmission demand of taking associated ADUs as the whole.

As the above embodiment, the illustration of a principle and effects in relation to the ADU-association-control demand information and the ADU-association-control parameter may also refer to the embodiments of the core network device side, which is not repeated herein.

In an embodiment, the process of the base station acquiring the ADU-association-control parameter may include receiving the ADU-association-control parameter sent by the core network device, or acquiring the ADU-association-control parameter from the second information.

The core network device may directly acquire the ADU-association-control demand information in the current data transmission process based on the configured information, determines the ADU-association-control parameter based on the ADU-association-control demand information, and then sent the ADU-association-control parameter to the base station. When the core network device sends the second information to the base station, the ADU-association-control parameter may be carried alone and then is sent to the base station. Alternatively, the ADU-association-control parameter is carried together with the ADU association information and then is sent to the base station. In this way, the base station is allowed to schedule the sent data pocket, allocate the resources, or guarantee the demand of sending the associated ADUs as the whole based on the ADU-association-control parameter.

An ADU association information performed by the device of the AF as the executing entity is illustrated through some embodiments in the following. Also, it is noted that the ADU association method performed at a side of the device of the AF has been illustrated in the embodiments of the ADU association method preformed at the core network device side and the embodiments of the ADU association method preformed at the base station side. Each of the following embodiments will provide brief description, and repeated contents are not repeated and may refer to the foregoing embodiments.

In an embodiment, the ADU association method is provided. This embodiment includes sending the first information, and the first information including the ADU association information.

In an embodiment, an operation of sending the first information includes sending the first information to the core network device.

In an embodiment, the first information is configured to perform at least one of identifying the ADUs, determining the associated ADUs, indicating the ADU-association-controls, and processing the associated ADUs.

After the device of the AF sends the first information to the core network device, the core network device sends the first information to the base station. Since the first information includes the ADU association information, the base station may process the associated ADUs based on the ADU association information after the receiving the first information. In some embodiment, the base station may perform the synchronous processing for the associated ADUs.

The device of the AF may be the application APP or the application function may also come from the UE side. Taking the device of the AF being the application APP, in the actual applications, the application APP sends the first information to the core network device. The first information includes the ADU association information.

The core network device may perform at least one of the identifying the ADUs, determining the associated ADUs, the indicating the ADU-association-controls, and the processing the associated ADUs, which is not limited in the embodiments of the present disclosure.

The illustration of the identifying the ADUs, determining the associated ADUs, the indicating the ADU-association-controls, and the processing the associated ADUs described above may refer to the illustration of the principle and the effects of the embodiments at the core network device side, which is not repeated herein.

The ADU association information, in combination with the actual scenarios, may be distinguished based on the indicated contents, the concrete association objects thereof, the indicated concrete association items, as depicted in the following embodiments.

In an embodiment, the ADU association information is configured to indicate at least one of the association information between the different ADUs, the identification information of the different ADUs, and the identifier information of the ADUs.

In an embodiment, the identification information of the ADUs includes at least one of the ADU identifiers, the ADU periods, the data arriving times of the ADUs, the data arriving offsets of the ADUs, and the pocket sizes of the ADUs, and the IP five-tuples.

In an embodiment, the association information between the ADUs includes at least one of the association information between the frames, the association information between the encoded chips, the association relationship between the different data flows, and the association relationship between the different QoS flows.

In an embodiment, the association information between the ADUs includes at least one of the one or more association relationship between a first ADU and at least one second ADU, the number of the associations between the first ADU and the at least one second ADU, the one or more time point at which the first ADU and the at least one second ADU start to be associated, the one or more time at which the first ADU and the at least one second ADU associated with the first ADU arrive, and the one or more association period of the first ADU and the at least one second ADU.

The at least one second ADU includes the same ADU, or the at least one second ADU includes the different ADUs.

In an embodiment, the ADU association information is configured to indicate at least one of the one or more association relationship between the first ADU and the at least one second ADU, the number of the associations between the first ADU and the at least one second ADU, the one or more time point at which the first ADU and the at least one second ADU start to be associated, the one or more time at which the first ADU and the at least one second ADU associated with the first ADU arrive, and the one or more period of the first ADU and the at least one second ADU.

The at least one second ADU includes the same ADU, or the at least one second ADU includes different ADUs.

The illustration of the principle and the effects of each embodiment in relation to the ADU association information may refer to the embodiments of the core network device side and is not repeated herein.

In order to ensure to accurately process or synchronously process the associated ADUs, in addition to the ADU association information, the device of the AF may also acquire the ADU-association-control demand information.

The device of the AF may send ADU-association-control demand information to the core network device.

In an embodiment, the ADU-association-control demand information is configured to determine the ADU-association-control parameter.

The core network device may determine the ADU-association-control parameter based on the ADU-association-control demand information and send the ADU-association-control parameter to the base station, such that the base station may be allowed to schedule the sent data pocket and allocate the resources, or guarantee the demand of sending the associated ADUs as the whole based on the ADU-association-control parameter.

In an embodiment, the ADU-association-control demand information includes at least one of the associated ADUs being required to be sent to the UE simultaneously, the associated ADUs being required to arrive at the UE simultaneously, the associated ADUs being required to arrive at the UE adjacently in sequence, the maximum time interval of the associated ADUs arriving at the UE, the earliest time of the associated ADUs arriving at the UE, the latest time of the associated ADUs arriving at the UE, and the data transmission demand of taking associated ADUs as the whole.

As the above embodiment, the illustration of the principle and the effects in relation to the ADU-association-control demand information and the ADU-association-control parameter may also refer to the embodiments of the core network device side, which is not repeated herein.

In an embodiment, the ADU-association-control demand information is carried in the first information.

After receiving the ADU-association-control demand information sent by the device of the AF, the core network device may not determine the ADU association information, but directly carry the ADU-association-control demand information in the first information and send the first information to the base station. In this way, after receiving the first information, the base station may be informed of the ADU-association-control demand information and preforming the operation of determining the ADU-association-control parameter based on the ADU-association-control demand information. After the ADU-association-control parameter is determined, the base station may schedule the sent data pocket, allocate the resources, or guarantee the demand of sending the associated ADUs as the whole based on the ADU-association-control parameter.

It should be understood that, although each operation in flowcharts of the above embodiments is shown as indicated by arrows in sequence, these operations are not necessary to be performed as a sequence indicated by the arrows. Unless expressly stated herein, no strict order limitation is made for the execution of these operations, and these operations may be performed in other orders. Moreover, at least a part of the operations in the above embodiments may include a plurality of sub operations or a plurality of phases. The sub operations or the phases are not necessary to be performed and completed at the same moment and may be performed at different moments. An executing order of these sub operations or the phases is also not necessary to be executed in sequence. Instead, they may be executed with other operations or at least a part of sub operations or phases of other operations in turn or alternatively.

Additionally, the embodiments of the present disclosure further provide several different ADU association methods as followed.

Embodiment one: an ADU association method is provided. This embodiment is for DL. A user plane network element (the application function) acquires the association information and adds the association identifier into the header based on the association information. The base station performs scheduling, resource allocating, or guaranteeing the demand of sending the associated ADUs as the whole at least based on the association identifier in the header. This embodiment includes a process of 1-5.

1. The application function provides the ADU association information to the PCF unit. The ADU association information includes ADU identification information having an association relationship, which may be at least one of a)-h) in the following.

a) the ADU association information may be the association information between the frames of the audio/video stream (such as the I frame and the P frame), or may also be the association information between the encoded chips in the frame (such as the I encoded frame and the P encoded frame). Alternatively, the ADU association information may be the association information of the pose data flow and the video data flow.

b) the ADU association information may include the first ADU identification information, the second ADU identification information, and the third ADU identification information, and the like.

c) the ADU association information includes at least one of one or more indication of the first ADU being associated with a $X^{th}$ ADU, the number of associations between the first ADU and the $X^{th}$ ADU, one or more time point at which the first ADU and the $X^{th}$ ADU start to be associated, one or more time at which the first ADU and the X ADU associated with the first ADU arrive, and one or more association period of the first ADU and the $X^{th}$ ADU. X may be one kind of ADU or may also be multiple kinds of ADUs.

d) the identification information of the ADUs includes, but is not limited to, at least one of the ADU identifiers, the ADU periods, the data arriving times of the ADUs, the data arriving offsets of the ADUs, and the pocket sizes of the ADUs.

e) For example, the arriving time of the first ADU, the indication of the first ADU being associated with the second ADU, the first ADU is associated with the second ADU.

f) For example, the starting time point of the first ADU being associated with the second ADU, the first ADU is associated with the second ADU.

g) For example, the time at which the first ADU and the second ADU associated with the first ADU arrive are X and Y.

h) In some embodiments, the PCF unit is further provided with ADU-association-control demand. For example, the ADU-association-control demand includes, but is not limited to, any one or combination of I to Iv.

I. the associated ADUs being required to arrive at the UE simultaneously.

Ii. the associated ADUs being required to arrive at the UE adjacently in sequence. That is, one by one, after the first one of the ADUs is processed, another ADU associated with the first one of the ADUs is required to be processed immediately thereafter.

Iii. the maximum time interval of the associated ADUs arriving at the UE,

Iv. A transmission requirement of taking the plurality of ADUs as the whole, such as the time delay, the error code rate, etc.

2. The PCF unit sends the ADU association information to the SMF unit.

a). In some embodiments, the PCF unit further determines the ADU-association-control parameter based on the ADU-association-control demand and sends the ADU-association-control parameter to the SMF unit.

3. The SMF unit sends the ADU association information to the UPF unit.

4. The UPF unit identifies the associated ADUs based on the ADU association information and adds the association identifier into the header of the data pocket.

a). The association identifier includes one or more flags of the first ADU being associated with the $X^{th}$ ADU. In some embodiments, a gNB (the base station) is required to be informed of, e.g., the identification information of the first ADU, the arriving time point of the first ADU, etc.

b). Alternatively, the association identifier includes the numerals of the associated ADUs (such as associated, or A and B identifiers associated), or the same Sequence Number (SN), or the consecutive SNs. In some embodiments, if the association identifier includes the consecutive SN, the gNB is further required to be informed of the starting SN and/or the number of the associations. The stating SN may be indicated to the gNB through the header, or be directly told to the gNB.

c). In some embodiments, the UPF sends the associated ADUs together to the gNB.

For example, the UPF may buffer the received ADUs. After the associated ADUs all arrive at the UPF unit, the associated ADUs then are sent to the gNB together. In some embodiments, the UPF unit configures a data buffer area. After the associated ADUs all arrive at the data buffer area, the associated ADUs are then sent to the gNB.

d). For example, for the associated ADUs, headers of these pockets carry the same SNs.

e). For example, for the associated ADUs, the headers of these pockets carry the consecutive SNs. In some embodiments, meanwhile, the gNB is informed of the starting SN of the associated ADUs and/or the number of the associations of the associated ADUs.

f). For example, for the associated ADUs, the headers of these pockets indicate pocket association. Meanwhile, the gNB is informed of starting arriving time points of the associated ADUs, and/or the number of the associations of the associated ADUs.

5. The base station receives the data pocket, determines the associated ADUs at least based on the header information (the association identifier) in the pocket, and process the associated ADUs.

For example, scheduling, resource allocating, and guaranteeing the demand of sending the whole. For example, the two ADUs are ensured to arrive at the UE simultaneously, or adjacently, or within a particular time period. Alternatively, the plurality of associated ADUs is sent as the whole, such that the aspects such as the time delay, the code error rate, etc., may obtain the transmission assurance.

In the above embodiment, through acquiring the ADU association information, the associated ADUs are ensured to be processed or processed simultaneously, and the whole business transmission demand is achieved.

Embodiment two: an ADU association method is provided. This embodiment is for the DL. The user plane network element (the application function) acquires the association information and adds the identifiers of the identified ADUs into the header based on the association information. The base station performs scheduling, resource allocating, or guaranteeing the demand of sending the associated ADUs as the whole at least based on the ADU identifiers in the header and the one or more association relationship of the ADUs acquired from the SMF unit. This embodiment includes a process of 1-6 in the following.

1. The application function provides the ADU association information to the PCF unit. The ADU association information includes the ADU identification information having the association relationship, which may be at least one of a)-h) in the following.

a) the ADU association information may be the association information between the frames of the audio/video stream (such as the I frame and the P frame), or may also be the association information between the encoded chips in the frame (such as the I encoded frame and the P encoded frame). Alternatively, the ADU association information may be the association information of the pose data flow and the video data flow.

b) the ADU association information may include the first ADU identification information, the second ADU identification information, and the third ADU identification information, and the like.

c) the ADU association information includes at least one of the one or more indication of the first ADU being associated with the $X^{th}$ ADU, the number of the associations between the first ADU and the $X^{th}$ ADU, the one or more time point at which the first ADU and the $X^{th}$ ADU start to be associated, the one or more time at which the first ADU and the X ADU associated with the first ADU arrive, and the one or more association period of the first ADU and the $X^{th}$ ADU. X may be one kind of ADU or may also be multiple kinds of ADUs.

d) the identification information of the ADUs includes, but is not limited to, at least one of the ADU identifiers, the ADU periods, the data arriving times of the ADUs, the data arriving offsets of the ADUs, and the pocket sizes of the ADUs.

e) For example, the arriving time of the first ADU, the indication of the first ADU being associated with the second ADU, the first ADU is associated with the second ADU.

f) For example, the starting time point of the first ADU being associated with the second ADU, the first ADU is associated with the second ADU.

g) For example, the time at which the first ADU and the second ADU associated with the first ADU are X and Y.

h) In some embodiments, the PCF unit is further provided with the ADU-association-control demand. For example, the ADU-association-control demand includes, but is not limited to, any one or combination of I to Iv.

I. the associated ADUs being required to arrive at the UE simultaneously.

Ii. the associated ADUs being required to arrive at the UE adjacently in sequence. That is, one by one, after the first one of the ADUs is processed, another ADU associated with the first one of the ADUs is required to be processed immediately thereafter.

Iii. the maximum time interval of the associated ADUs arriving at the UE,

Iv. A transmission requirement of taking the plurality of ADUs as the whole, such as the time delay, the error code rate, etc.

2. The PCF unit sends the ADU association information to the SMF unit.

a). In some embodiments, the PCF unit further determines the ADU-association-control parameter based on the ADU-association-control demand and sends the ADU-association-control parameter to the SMF unit.

3. The SMF unit sends the ADU identification information in the ADU association information to the UPF unit.

4. The UPF unit identifies the associated ADUs based on the ADU association information and adds the ADU identifiers into the header of the data pocket.

5. The SMF unit tells the ADU association information to the base station.

a). the ADU association information may be a full set or a sub set of one or more ADU association relationship describe above (for example, only includes 1c).

6. The base station receives the data pocket, determines the associated ADUs at least based on the header information (the ADU identifiers) in the pocket and the ADU association information, and process the associated ADUs.

a). For example, scheduling, resource allocating, and guaranteeing the demand of sending the whole. For example, the two ADUs are ensured to arrive at the UE simultaneously, or adjacently, or within a particular time period. Alternatively, the plurality of associated ADUs is sent as the whole, such that the aspects such as the time delay, the code error rate, etc., may obtain the transmission assurance.

In the above embodiment, the association information is provided to the gNB, and the identification information is provided to the UPF unit, such that the associated ADUs are ensured to be processed or processed simultaneously, and the whole business transmission demand is achieved.

Embodiment three: an ADU association method is provided. This embodiment is for the DL. The gNB acquires the association information. The gNB schedule the received ADUs, allocate the resources, and guarantee the demand of sending the associated ADUs as the whole based on the association information. This embodiment includes a process of 1-4 in the following.

1. The application function provides the ADU association information to the PCF unit. The ADU association information includes the ADU identification information having the association relationship, which may be at least one of a)-h) in the following.

a) the ADU association information may be the association information between the frames of the audio/video stream (such as the I frame and the P frame), or may also be the association information between the encoded chips in the frame (such as the I encoded frame and the P encoded frame). Alternatively, the ADU association information may be the association information of the pose data stream and the video data stream.

b) the ADU association information may include the first ADU identification information, the second ADU identification information, and the third ADU identification information, and the like.

c) the ADU association information includes at least one of the one or more indication of the first ADU being associated with the $X^{th}$ ADU, the number of the associations between the first ADU and the $X^{th}$ ADU, the one or more time point at which the first ADU and the $X^{th}$ ADU start to be associated, the one or more time at which the first ADU and the $X^{th}$ ADU associated with the first ADU arrive, and the one or more association period of the first ADU and the $X^{th}$ ADU. X may be one kind of ADU or may also be multiple kinds of ADUs.

d) the identification information of the ADUs includes, but is not limited to, at least one of the ADU identifiers, the ADU periods, the data arriving times of the ADUs, the data arriving offsets of the ADUs, and the pocket sizes of the ADUs.

e) For example, the arriving time of the first ADU, the indication of the first ADU being associated with the second ADU, the first ADU is associated with the second ADU.

f) For example, the starting time point of the first ADU being associated with the second ADU, the first ADU is associated with the second ADU.

g) For example, the time at which the first ADU and the second ADU associated with the first ADU arrive are X and Y.

h) In some embodiments, the PCF unit is further provided with the ADU-association-control demand. For example, the ADU-association-control demand includes, but is not limited to, any one or combination of I to Iv.

I. the associated ADUs being required to arrive at the UE simultaneously.

Ii. the associated ADUs being required to arrive at the UE adjacently in sequence. That is, one by one, after the first one of the ADUs is processed, another ADU associated with the first one of the ADUs is required to be processed immediately thereafter.

Iii. the maximum time interval of the associated ADUs arriving at the UE,

Iv. A transmission requirement of taking the plurality of ADUs as the whole, such as the time delay, the error code rate, etc.

2. The PCF unit sends the ADU association information to the SMF unit.

a). In some embodiments, the PCF unit further determines the ADU-association-control parameter based on the ADU-association-control demand and sends the ADU-association-control parameter to the SMF unit.

3. The SMF unit sends the ADU association information to the gNB.

a). In some embodiments, the ADU-association-control parameter may also be included.

4. The gNB identifies the associated ADUs based on the ADU association information and process the associated ADUs.

a). processing the associated ADUs, such as scheduling, resource allocating, and guaranteeing the demand of sending the whole. For example, the two ADUs are ensured to arrive at the UE simultaneously, or adjacently, or within a particular time period. Alternatively, the plurality of associated ADUs is sent as the whole, such that the aspects such as the time delay, the code error rate, etc., may obtain the transmission assurance.

In the above embodiment, the base station directly processes the association, which avoid the operation performed by the UPF unit for the header.

Figure 12:
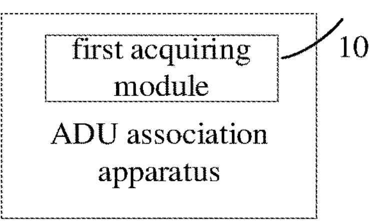
FIG. 12 is a structural schematic view of an ADU association apparatus according to an embodiment.

In an embodiment, as shown in FIG. 12, an ADU association apparatus is provided. The apparatus includes a first acquiring module.

The first acquiring module is configured to acquire first information. The first information includes ADU association information.

In an embodiment, the first acquiring module includes a receiving unit. The receiving unit is configured to receive the first information sent by a device of an application function (AF).

In an embodiment, the first information is configured to perform at least one of identifying ADUs, indicating associated ADUs, indicating ADU-association-controls, and processing the associated ADUs.

In an embodiment, the ADU association information is configured to indicate at least one of association information between different ADUs, identification information of the different ADUs, and identifier information of ADUs.

In an embodiment, the association information between the different ADUs includes at least one of association information between frames; association information between encoded chips; an association relationship between different data flows; and an association relationship between different QoS flows.

In an embodiment, the association information between the different ADUs includes at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the identification information of the different ADUs includes at least one of ADU identifiers, ADU periods, data arriving times of the ADUs, data arriving offsets of the ADUs, and pocket sizes of the ADUs, and IP five-tuples.

In an embodiment, the ADU association information is configured to indicate at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the first acquiring module is further configured to acquire ADU-association-control demand information.

In an embodiment, the ADU-association-control demand information is carried in the first information.

In an embodiment, the receiving unit is further configured to receive the ADU-association-control demand information sent by a device of an AF.

In an embodiment, the apparatus further includes a parameter-determining module. The parameter-determining module is configured to determine an ADU-association-control parameter based on the ADU-association-control demand information.

In an embodiment, the apparatus further includes a parameter-sending module. The parameter-determining module is configured to send the ADU-association-control parameter to a base station.

In an embodiment, the ADU-association-control demand information includes at least one of associated ADUs being required to be sent to a UE simultaneously; the associated ADUs being required to arrive at the UE simultaneously; the associated ADUs being required to arrive at the UE adjacently in sequence; a maximum time interval of the associated ADUs arriving at the UE; an earliest time of the associated ADUs arriving at the UE; a latest time of the associated ADUs arriving at the UE; and a data transmission demand of taking associated ADUs as a whole.

In an embodiment, the apparatus further includes at least one of an identifying module, a first data pocket generating module, a first data pocket sending module.

The identifying module is configured to identify ADUs based on the ADU association information; and identify associated ADUs based on the ADU association information.

The first data pocket generating module is configured to add an association identifier into a header of a data pocket to obtain a first data pocket based on the ADUs and/or the associated ADUs.

The first data pocket sending module is configured to send the first data pocket to a base station.

In an embodiment, the apparatus further includes at least one of a PFF unit, a SMF unit, and a UPF unit.

The PFF unit is configured to send the ADU association information to the SMF unit.

The SMF unit is configured to send the ADU association information to the UPF unit.

The UPF unit is configured to identify ADUs and/or associated ADUs based on the ADU association information.

The UPF unit is further configured to add an association identifier into a header of a data pocket to obtain a first data pocket based on the ADUs and/or the associated ADUs.

The UPF unit is further configured to send the first data pocket to a base station.

In an embodiment, the UPF unit is further configured to perform at least one of buffering received ADUs in a buffer area; and processing the ADUs after the associated ADUs all arrive at the buffer area.

In an embodiment, the UPF unit is further configured to perform at least one of sending, the associated ADUs to the base station; adding the ADU association information into the first data pocket; and generating the first data pocket based on the associated ADUs.

In an embodiment, the association identifier includes an identifier of a first ADU and a second ADU being associated.

In an embodiment, the header of the first data pocket further includes identification information of the first ADU.

In an embodiment, the association identifier includes any one of an indication of the ADUs being the associated ADUs, numerals of the associated ADUs, a same Sequence Number (SN), and consecutive SNs.

In an embodiment, in response to the association identifier including the consecutive SNs of the associated ADU, the header of the first data pocket further includes a starting SN and/or the number of associated SNs.

In an embodiment, the apparatus further includes at least one of a second data pocket generating module and a second data pocket sending module.

The second data pocket generating module is configured to add ADU identifiers to the header of the packet to obtain a second packet.

In an embodiment, the second data pocket sending module is configured to send the second packet and the ADU association information to a base station.

In an embodiment, the apparatus further includes at least one of the PCF unit, the SMF unit, and the UPF unit.

The PCF unit is further configured to send the ADU association information to the SMF unit.

The SMF unit is further configured to send the ADU association information and/or identification information of ADUs to the UPF unit.

The UPF unit is further configured to identify the ADUs based on the ADU association information.

The UPF unit is further configured to add the ADU identifiers to a header of a data packet to obtain a second data packet.

The UPF unit is further configured to send the second data packet to a base station.

The AMF or SMF or UPF unit is further configured to send the ADU association information to the base station.

In an embodiment, the apparatus further includes an association information sending module. The association information sending module is configured to send the ADU association information to the base station.

In an embodiment, the PCF unit described above is further configured to send the ADU association information to the SMF unit.

Alternatively, the SMF unit described above is further configured to send the ADU association information to the base station.

In an embodiment, the apparatus further includes at least one of the UPF unit described above.

The UPF unit is further configured to buffer received ADUs in a buffer area.

The UPF unit is further configured to process the ADUs after the associated ADUs all arrive at the buffer area.

In an embodiment, the embodiments of the present disclosure provide an ADU association apparatus. The apparatus includes a second acquiring module.

The second acquiring module is configured to acquire second information. The second information is configured to indicate associated ADUs.

In an embodiment, the second information is configured to perform at least one of: identifying ADUs, indicating associated ADUs, indicating ADU-association-controls, and processing the associated ADUs.

In an embodiment, the second acquiring module includes a second information receiving unit. The second information receiving unit is configured to receive the second information sent by a core network device.

In an embodiment, the second information includes a first data packet, a header of the first data pocket includes ADU identifiers and/or an ADU association identifier.

In an embodiment, the association identifier is determined based on ADU association information.

In an embodiment, the association identifier includes an identifier of a first ADU and a second ADU being associated.

In an embodiment, the header of the first data packet further includes identification information of the first ADU.

In an embodiment, the association identifier includes any one of numerals of the associated ADUs, a same SN, and consecutive SNs.

In an embodiment, in response to the association identifier including the consecutive SNs of the associated ADU, the header of the first data pocket further includes a starting SN and/or the number of associated SNs.

In an embodiment, the apparatus further includes an associated ADU determining nodule. The associated ADU determining nodule is configured to determine the associated ADUs based on the ADU identifiers and/or the ADU association identifier.

In an embodiment, the apparatus further includes a data processing module. The data processing module is configured to perform data processing for the associated ADUs.

In an embodiment, the second information includes ADU association information.

In an embodiment, the apparatus further includes an association information determining module. The association information determining module is configured to determine the associated ADUs based on the ADU association information and ADU identifiers in a third data packet.

In an embodiment, the association information determining module described above includes a first determining unit.

The first determining unit is configured to determine the associated ADUs based on the ADU association information and ADU identifiers in a third data packet.

In an embodiment, the association information determining module described above further includes a second determining module.

The second determining module is configured to determine the associated ADUs based on the ADU association information and a fourth data packet.

In an embodiment, the data processing module is configured to perform data processing for the associated ADUs.

In an embodiment, the ADU association information is configured to indicate at least one of association information between different ADUs, identification information of the different ADUs, and identifier information of ADUs.

In an embodiment, the association information between the different ADUs includes at least one of association information between frames; association information between encoded chips; an association relationship between different data flows; and an association relationship between different QoS flows.

In an embodiment, the association information between the different ADUs includes at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the identification information of the different ADUs includes at least one of ADU identifiers, ADU periods, data arriving times of the ADUs, data arriving offsets of the ADUs, and pocket sizes of the ADUs, and IP five-tuples.

In an embodiment, the ADU association information is configured to indicate at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the apparatus further includes a control parameter acquiring module. The control parameter acquiring module is configured to acquire an ADU-association-control parameter.

In an embodiment, the control parameter acquiring module includes a control parameter receiving unit.

The control parameter receiving unit is configured to receive the ADU-association-control parameter sent by a core network device.

Alternatively, the control parameter receiving unit is configured to acquire the ADU-association-control parameter from the second information.

In an embodiment, the ADU-association-control parameter is determined based on ADU-association-control demand information.

In an embodiment, the ADU-association-control demand information includes at least one of associated ADUs being required to be sent to a UE simultaneously; the associated ADUs being required to arrive at the UE simultaneously; the associated ADUs being required to arrive at the UE adjacently in sequence; a maximum time interval of the associated ADUs arriving at the UE; an earliest time of the associated ADUs arriving at the UE; a latest time of the associated ADUs arriving at the UE; and a data transmission demand of taking associated ADUs as a whole.

In an embodiment, an ADU association apparatus is provided in the embodiments of the present disclosure. The apparatus includes a processing unit.

The processing unit is configured to send first information through a sending module. The first information includes ADU association information.

In an embodiment, the sending module includes a sending unit. A processing module is further configured to send the first information to the core network device through the sending unit.

In an embodiment, the first information is configured to perform at least one of identifying ADUs, determining associated ADUs, indicating ADU-association-controls, and processing the associated ADUs.

In an embodiment, the first information is configured to indicate at least one of association information between different ADUs, identification information of the different ADUs, and identifier information of ADUs.

In an embodiment, the association information between the different ADUs includes at least one of association information between frames; association information between encoded chips; an association relationship between different data flows; and an association relationship between different QoS flows.

In an embodiment, the association information between the different ADUs includes at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the identification information of the different ADUs includes at least one of ADU identifiers, ADU periods, data arriving times of the ADUs, data arriving offsets of the ADUs, and pocket sizes of the ADUs, and IP five-tuples.

In an embodiment, the ADU association information is configured to indicate at least one of one or more association relationship between a first ADU and at least one second ADU; the number of associations between the first ADU and the at least one second ADU; one or more time point at which the first ADU and the at least one second ADU start to be associated; one or more time at which the first ADU and the at least one second ADU associated with the first ADU arrive; and one or more association period of the first ADU and the at least one second ADU.

The at least one second ADU includes the same ADU, or the at least one second ADU includes different ADUs.

In an embodiment, the apparatus further includes a control demand sending module. The control demand sending module is configured to send ADU-association-control demand information.

In an embodiment, the ADU-association-control demand information is carried in the first information.

In an embodiment, the ADU-association-control demand information is configured to determine an ADU-association-control parameter.

In an embodiment, the ADU-association-control demand information includes at least one of associated ADUs being required to be sent to a UE simultaneously; the associated ADUs being required to arrive at the UE simultaneously; the associated ADUs being required to arrive at the UE adjacently in sequence; a maximum time interval of the associated ADUs arriving at the UE; an earliest time of the associated ADUs arriving at the UE; a latest time of the associated ADUs arriving at the UE; and a data transmission demand of taking associated ADUs as a whole.

In an embodiment, concrete limitations of the ADU association apparatus may refer to limitations to the ADU association method in the above, which are not repeated herein. Various modules in the ADU association apparatus described above may be implemented in part or in whole through a hard ware, a soft ware, and a combination thereof. The various modules may be embedded in or independent of a processor in a computer device in a form of the hardware, or may be stored in a memory in the computer device in a form of the software, so as to facilitate the processor to call and execute one or more operation corresponding to each module.

Figure 13:
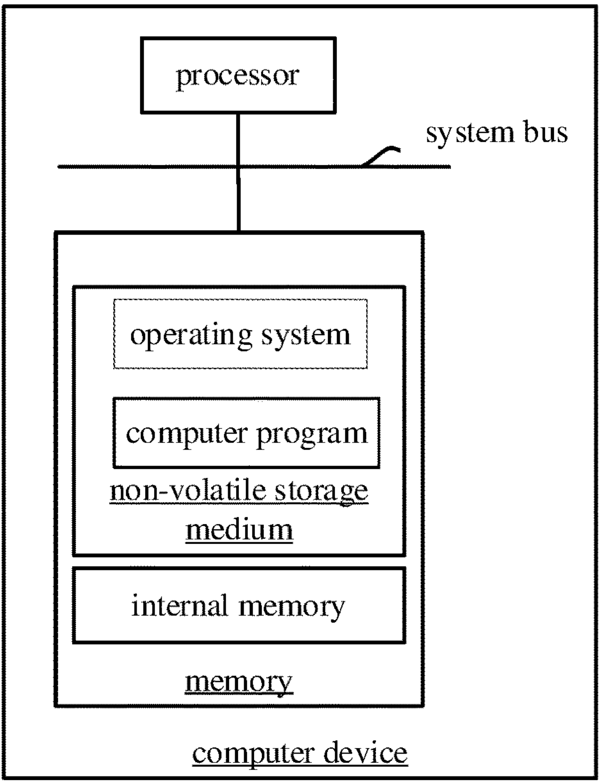
FIG. 13 is a schematic view of an inner structure of a computer device according to an embodiment.

In an embodiment, a computer device is provided. The computer device may be a server. An internal structural view of the computer device is as shown in FIG. 13. The computer device includes a processor, a memory, a network interface, and a database which are connected via a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for operating of the operating system and the computer program in the non-volatile storage medium. The database of the computer device is configured to store resource query processing data. The network interface of the computer device is configured to communicate with an external terminal via a network connection. When the computer program is executed by the processor, a resource query processing method is performed.

It will be appreciated by those skilled in the art that a structure illustrated in FIG. 13 is simply a block view of a part of structure related to the solution of the present disclosure, constituting no limitation to the computer device in which the solution of the present disclosure is performed. A concrete computer device may include more or fewer components than those shown in the drawing, or may combine some components, or may have a different component arrangement.

In an embodiment, a computer device is provided and includes a memory and a processor. The memory stores a computer program. When the processor executes the computer program, an operation of acquiring first information is implemented. The first information includes ADU association information.

In an embodiment, when the processor executes the computer program, an operation of acquiring second information is implemented. The second information is configured to indicate associated ADUs.

In an embodiment, when the processor executes the computer program, an operation of sending first information is implemented. The first information includes ADU association information.

A principle and technical effects of the computer device provided in the above embodiments are similar to those of the method embodiments described above, which are not repeated herein.

In an embodiment, a computer-readable storage medium is provided and stores a computer program. When the computer program is executed by a processor, an operation of acquiring first information is implemented. The first information includes ADU association information.

In an embodiment, when the computer program is executed by a processor, an operation of acquiring second information is implemented. The second information is configured to indicate associated ADUs.

In an embodiment, when the computer program is executed by a processor, an operation of sending first information is implemented. The first information includes ADU association information.

A principle and technical effects of the computer-readable storage medium provided in the above embodiments are similar to those of the method embodiments described above, which are not repeated herein.

One of ordinary skill in the art may understand that all or a part of processes in the methods of the embodiments described above may be accomplished by instructing an associated hardware through a computer program. The computer program may be storable in a non-volatile computer-readable storage medium. When the computer program is executed, one or more process of the embodiments of each method may be included. Any reference to the memory, storage, the data base, or other media, used in each embodiment of the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As illustration rather than limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a Rambus direct RAM (RDRAM), a direct RDRAM (DRDRAM), and a Rambus dynamic RAM (RDRAM), etc.

Each technical feature of the above embodiments may be combined in any way. For the sake of conciseness of description, all possible combinations of each technical feature of each of the above embodiments are not described. However, as long as a combination of these technical features has no contradiction, this combination should be considered as the scope recited in the specification. The above embodiments only express some implementations of the present disclosure, with a concrete and detailed description, but should not thereby be construed as limitations to the scope of the present disclosure. It should be noted that for the one of ordinary skill in the art, some verifications and modifications may be carried out without departing from the conception of the present disclosure, which all fall into the scope of the present disclosure. Therefore, the scope of the present disclosure should be subject to appended claims.

What is claimed is:

1. An application data unit (ADU) association method, comprising:

acquiring first information, wherein the first information comprises ADU association information, the ADU association information is configured to indicate identification information of different ADUs, and the identification information of the different ADUS comprises ADU identifiers;

the method further comprises:

acquiring ADU-association-control demand information; wherein the ADU-association-control demand information is carried in the first information, and the ADU-association-control demand information comprises a latest time of associated ADUs arriving at a UE;

determining an ADU-association-control parameter based on the ADU-association-control demand information;

sending the ADU-association-control parameter to a base station.

2. The method according to claim 1, wherein the acquiring first information, comprises:

receiving the first information sent by a device of an application function AF.

3. The method according to claim 1, wherein the first information is configured to perform at least one of: identifying ADUS, indicating the associated ADUs, indicating ADU-association-controls, and processing the associated ADUs; and/or wherein the ADU association information is further configured to indicate at least one of association information between different ADUs, and identifier information of ADUs.

4. The method according to claim 3, wherein the identification information of the different ADUs further comprises at least one of ADU periods, data arriving times of the ADUs, data arriving offsets of the ADUs, and pocket sizes of the ADUs, and IP Internet Protocol five-tuples.

5. The method according to claim 1, wherein the acquiring ADU-association-control demand information, comprises:

receiving the ADU-association-control demand information sent by a device of an AF.

6. The method according to claim 1, wherein the ADU-association-control demand information further comprises at least one of:

associated ADUs being required to be sent to the UE simultaneously;

the associated ADUs being required to arrive at the UE simultaneously;

the associated ADUs being required to arrive at the UE adjacently in sequence;

a maximum time interval of the associated ADUs arriving at the UE;

an earliest time of the associated ADUs arriving at the UE;

a data transmission demand of taking associated ADUs as a whole.

7. The method according to claim 1, further comprising at least one of:

sending, by a Policy Control Function PCF unit, the ADU association information to a Session Management Function SMF unit;

sending, by the SMF unit, the ADU association information to a User Plane Function UPF unit;

identifying, by the UPF unit, ADUs and/or associated ADUs based on the ADU association information;

adding, by the UPF unit, an association identifier into a header of a data pocket to obtain a first data pocket based on the ADUs and/or the associated ADUs;

sending, by the UPF unit, the first data pocket to a base station.

8. The method according to claim 7, wherein the association identifier comprises any one of an indication of the ADUs being the associated ADUs, numerals of the associated ADUs, a same Sequence Number SN, and consecutive SNs.

9. The method according to claim 1, further comprising at least one of:

sending, by a PCF unit, the ADU association information to a SMF unit;

sending, by the SMF unit, the ADU association information and/or identification information of ADUs to a UPF unit;

identifying, by the UPF unit, the ADUs based on the ADU association information;

adding, by the UPF unit, the ADU identifiers to a header of a data packet to obtain a second data packet;

sending, by the UPF unit, the second data packet to a base station; and sending, by the AMF or SMF or UPF unit, the ADU association information to the base station.

10. An application data unit (ADU) association method, comprising:

sending first information, wherein the first information comprises ADU association information, the ADU association information is configured to indicate identification information of different ADUs, and the identification information of the different ADUS comprises ADU identifiers;

the method further comprises:

sending ADU-association-control demand information; wherein the ADU-association-control demand information is carried in the first information, the ADU-association-control demand information comprises a latest time of associated ADUs arriving at a UE, and the ADU-association-control demand information is configured to determine an ADU-association-control parameter.

11. The method according to claim 10, wherein the sending first information, comprises:

sending the first information to a core network device.

12. The method according to claim 10, wherein the first information is configured to perform at least one of: identifying ADUs, determining the associated ADUs, indicating ADU-association-controls, and processing the associated ADUs; and/or wherein the ADU association information is further configured to indicate at least one of association information between different ADUs, and identifier information of ADUs.

13. The method according to claim 12, wherein the identification information of the different ADUs further comprises at least one of ADU periods, data arriving times of the ADUs, data arriving offsets of the ADUs, and pocket sizes of the ADUs, and IP five-tuples.

14. The method according to claim 10, wherein the ADU-association-control demand information further comprises at least one of:

associated ADUs being required to be sent to the UE simultaneously;

the associated ADUs being required to arrive at the UE simultaneously;

the associated ADUs being required to arrive at the UE adjacently in sequence;

a maximum time interval of the associated ADUs arriving at the UE;

an earliest time of the associated ADUs arriving at the UE; and a data transmission demand of taking associated ADUs as a whole.

15. A computer device, comprising:

a memory, configured to store a computer program; and a processor;

wherein when the processor executes the computer program, the processor is configured to perform:

sending first information, wherein the first information comprises ADU association information, the ADU association information is configured to indicate identification information of different ADUs, and the identification information of the different ADUs comprises ADU identifiers;

the processor is further configured to perform:

sending ADU-association-control demand information; wherein the ADU-association-control demand information is carried in the first information, the ADU-association-control demand information comprises a latest time of associated ADUs arriving at a UE, and the ADU-association-control demand information is configured to determine an ADU-association-control parameter.

16. The computer device according to claim 15, wherein the ADU-association-control demand information further comprises at least one of associated ADUs being required to be sent to the UE simultaneously;

the associated ADUs being required to arrive at the UE simultaneously;

the associated ADUs being required to arrive at the UE adjacently in sequence;

a maximum time interval of the associated ADUs arriving at the UE;

an earliest time of the associated ADUs arriving at the UE;

a data transmission demand of taking associated ADUs as a whole.

17. The computer device according to claim 15, wherein the sending first information, comprises:

sending the first information to a core network device.

18. The computer device according to claim 15, wherein the first information is configured to perform at least one of: identifying ADUs, determining the associated ADUs, indicating ADU-association-controls, and processing the associated ADUs; and/or wherein the ADU association information is further configured to indicate at least one of association information between different ADUs, and identifier information of ADUs.

19. The computer device according to claim 18, wherein the identification information of the different ADUs further comprises at least one of-ADU periods, data arriving times of the ADUs, data arriving offsets of the ADUs, and pocket sizes of the ADUs, and IP five-tuples.

* * * * *